(12) United States Patent
Jain et al.

(10) Patent No.: US 10,725,947 B2
(45) Date of Patent: Jul. 28, 2020

(54) BIT VECTOR GATHER ROW COUNT CALCULATION AND HANDLING IN DIRECT MEMORY ACCESS ENGINE

(71) Applicant: Oracle International Corporation, Redwood Shores, CA (US)

(72) Inventors: Rishabh Jain, Austin, TX (US); David A. Brown, Mountain View, CA (US); Michael Duller, San Francisco, CA (US); Christopher Joseph Daniels, Cedar Park, TX (US); Erik M. Schlanger, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 237 days.

(21) Appl. No.: 15/364,149

(22) Filed: Nov. 29, 2016

(65) Prior Publication Data

US 2018/0150259 A1     May 31, 2018

(51) Int. Cl.
*G06F 13/28* (2006.01)

(52) U.S. Cl.
CPC .................. *G06F 13/28* (2013.01)

(58) Field of Classification Search
None
See application file for complete search history.

(56) References Cited

U.S. PATENT DOCUMENTS

| 4,626,829 A | 12/1986 | Hauck |
| 5,109,226 A | 4/1992 | MacLean |

(Continued)

FOREIGN PATENT DOCUMENTS

| CN | 1711563 A | 12/2005 |
| CN | 101251791 A | 8/2008 |

(Continued)

OTHER PUBLICATIONS

Kociubes, U.S. Appl. No. 14/806,576, filed Jul. 22, 2015, Notice of Allowance, dated Apr. 11, 2018.

(Continued)

*Primary Examiner* — William B Partridge
(74) *Attorney, Agent, or Firm* — Marcel K. Bingham; Hickman Palermo Becker Bingham LLP

(57) ABSTRACT

Techniques are described herein for efficient movement of data from a source memory to a destination memory. In an embodiment, in response to a particular memory location being pushed into a first register within a first register space, the first set of electronic circuits accesses a descriptor stored at the particular memory location. The descriptor indicates a width of a column of tabular data, a number of rows of tabular data, and one or more tabular data manipulation operations to perform on the column of tabular data. The descriptor also indicates a source memory location for accessing the tabular data and a destination memory location for storing data manipulation result from performing the one or more data manipulation operations on the tabular data. Based on the descriptor, the first set of electronic circuits determines control information indicating that the one or more data manipulation operations are to be performed on the tabular data and transmits the control information, using a hardware data channel, to a second set of electronic circuits to perform the one or more operations. Based on the control information, the second set of electronic circuits retrieve the tabular data from source memory location and apply the one or more data manipulation operations to generate the data manipulation result. The second set of electronic circuits cause the data manipulation result to be stored at the destination memory location. Among the data manipulation operations that can be described are a bit vector based gather operation. The second set of electronic (Continued)

Data Movement System 101 circuits determine a row count, which is generated efficiently by the second set of electronic circuits and is used to perform a gather operation and other types of data manipulation operations more efficiently.

22 Claims, 8 Drawing Sheets

(56) References Cited

U.S. PATENT DOCUMENTS

| | | |
|---|---|---|
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |
| 5,581,705 A | 12/1996 | Passint et al. |
| 5,592,622 A | 1/1997 | Isfeld |
| 5,617,567 A | 4/1997 | Doktor |
| 5,655,080 A | 8/1997 | Dias et al. |
| 5,675,382 A | 10/1997 | Bauchspies |
| 5,696,956 A | 12/1997 | Guttag |
| 5,696,959 A | 12/1997 | Guttag |
| 5,706,495 A | 1/1998 | Chadha et al. |
| 5,826,529 A | 10/1998 | Doktor |
| 5,884,299 A | 3/1999 | Ramesh |
| 5,887,183 A | 3/1999 | Agarwal |
| 5,884,229 A | 5/1999 | Ramesh et al. |
| 5,933,650 A | 8/1999 | Van Hook |
| 5,987,407 A | 11/1999 | Wu |
| 5,996,708 A | 12/1999 | Weber |
| 6,006,179 A | 12/1999 | Wu |
| 6,047,081 A | 4/2000 | Groezinger et al. |
| 6,065,070 A | 5/2000 | Johnson |
| 6,118,724 A | 9/2000 | Higginbottom |
| 6,161,173 A | 12/2000 | Krishna |
| 6,178,405 B1 | 1/2001 | Ouyang |
| 6,219,457 B1 | 4/2001 | Potu |
| 6,317,824 B1 | 11/2001 | Thakkar et al. |
| 6,331,826 B1 | 12/2001 | Wagner |
| 6,336,180 B1 | 1/2002 | Long |
| 6,381,601 B1 | 4/2002 | Fujiwara et al. |
| 6,416,410 B1 | 7/2002 | Abou-Samra |
| 6,496,915 B1 | 12/2002 | Halleck |
| 6,604,155 B1 | 8/2003 | Chong et al. |
| 6,671,797 B1 | 12/2003 | Golston |
| 6,745,174 B2 | 6/2004 | Levy et al. |
| 6,779,105 B1 | 8/2004 | Bouyoux |
| 6,842,848 B2 | 1/2005 | Hokenek et al. |
| 6,996,569 B1 | 2/2006 | Bedell et al. |
| 7,020,661 B1 | 3/2006 | Cruanes |
| 7,047,252 B2 | 5/2006 | Buch et al. |
| 7,617,346 B2 | 11/2009 | Wang et al. |
| 7,725,595 B1 | 5/2010 | Geissler et al. |
| 7,769,726 B2 | 8/2010 | Faerber et al. |
| 7,861,060 B1 | 12/2010 | Nickollis et al. |
| 7,991,794 B2 | 8/2011 | Bedi et al. |
| 8,049,760 B2 | 11/2011 | Jiao et al. |
| 8,126,855 B2 | 2/2012 | Faerber et al. |
| 8,244,780 B1 | 8/2012 | Narayanan |
| 8,260,803 B2 | 9/2012 | Hsu et al. |
| 8,285,709 B2 | 10/2012 | Candea et al. |
| 8,326,810 B2 | 12/2012 | Faerber et al. |
| 8,375,145 B2 | 2/2013 | Kagan et al. |
| 8,521,788 B2 | 8/2013 | Ellison et al. |
| 8,533,216 B2 | 9/2013 | Buger et al. |
| 8,543,534 B2 | 9/2013 | Alves et al. |
| 8,572,131 B2 | 10/2013 | Ellison et al. |
| 8,589,613 B2 | 11/2013 | Griggs |
| 8,725,707 B2 | 5/2014 | Chen et al. |
| 8,826,522 B2 | 9/2014 | Roblot |
| 8,938,644 B2 | 1/2015 | Clark et al. |
| 8,996,463 B2 | 3/2015 | Merriman et al. |
| 9,405,476 B2 | 8/2016 | Joshi et al. |
| 9,432,298 B1 | 8/2016 | Smith |
| 9,658,675 B1 | 5/2017 | Witek |
| 2001/0037345 A1 | 11/2001 | Kiernan et al. |
| 2002/0032678 A1 | 3/2002 | Cornwell et al. |
| 2002/0033762 A1 | 3/2002 | Belu |
| 2002/0091826 A1 | 7/2002 | Comeau |
| 2002/0091905 A1 | 7/2002 | Krishna |
| 2002/0095562 A1 | 7/2002 | Nakanishi |
| 2002/0154154 A1 | 10/2002 | Cornelius |
| 2002/0165896 A1 | 11/2002 | Kim |
| 2002/0184392 A1 | 12/2002 | Parthasarathy et al. |
| 2002/0188830 A1 | 12/2002 | Boles et al. |
| 2003/0135495 A1 | 7/2003 | Vagnozzi |
| 2003/0167460 A1 | 9/2003 | Desai |
| 2003/0182464 A1 | 9/2003 | Hamilton |
| 2003/0187858 A1 | 10/2003 | Kirk et al. |
| 2004/0030863 A1 | 2/2004 | Paver |
| 2004/0068642 A1 | 4/2004 | Tanaka |
| 2004/0160446 A1 | 8/2004 | Gosalia |
| 2004/0221192 A1 | 11/2004 | Motta |
| 2005/0055384 A1 | 3/2005 | Ganesh |
| 2005/0071322 A1 | 3/2005 | Chen |
| 2005/0091256 A1 | 4/2005 | Rathakrishnan et al. |
| 2005/0177706 A1 | 8/2005 | Lee |
| 2006/0116989 A1 | 6/2006 | Bellamkonda et al. |
| 2006/0179255 A1 | 8/2006 | Yamazaki |
| 2006/0218194 A1 | 9/2006 | Yalamanchi |
| 2007/0061600 A1 | 3/2007 | Kuroda |
| 2007/0074214 A1 | 3/2007 | Ueno |
| 2007/0203925 A1 | 8/2007 | Sandler et al. |
| 2007/0260579 A1 | 11/2007 | Bae |
| 2008/0046686 A1 | 2/2008 | Cameron |
| 2008/0086480 A1 | 4/2008 | Srivastava |
| 2008/0086495 A1 | 4/2008 | Kizitunc |
| 2008/0134213 A1 | 6/2008 | Alverson |
| 2008/0294863 A1 | 11/2008 | Faerber et al. |
| 2009/0028192 A1 | 1/2009 | Rieger |
| 2009/0037700 A1 | 2/2009 | Graham |
| 2009/0055350 A1 | 2/2009 | Branish et al. |
| 2009/0094193 A1 | 4/2009 | King et al. |
| 2009/0235047 A1 | 9/2009 | Hachmann |
| 2009/0287628 A1 | 11/2009 | Indeck |
| 2009/0287637 A1 | 11/2009 | Day et al. |
| 2009/0313210 A1 | 12/2009 | Bestgen et al. |
| 2010/0020880 A1 | 1/2010 | Susnow |
| 2010/0030728 A1 | 2/2010 | Chakkappen et al. |
| 2010/0030796 A1 | 2/2010 | Netz et al. |
| 2010/0082705 A1 | 4/2010 | Bhashyam et al. |
| 2010/0088309 A1 | 4/2010 | Petcelescu et al. |
| 2010/0106944 A1 | 4/2010 | Symes |
| 2010/0115295 A1 | 5/2010 | Diab |
| 2010/0115347 A1 | 5/2010 | Noyes |
| 2010/0161646 A1 | 6/2010 | Ceballos et al. |
| 2010/0191918 A1 | 7/2010 | Lee et al. |
| 2010/0257391 A1 | 10/2010 | Dring |
| 2010/0278446 A1 | 11/2010 | Ganesh et al. |
| 2010/0281004 A1 | 11/2010 | Kapoor |
| 2010/0281013 A1 | 11/2010 | Graefe |
| 2010/0299316 A1 | 11/2010 | Faerber et al. |
| 2011/0029557 A1 | 2/2011 | Raghavan et al. |
| 2011/0106804 A1 | 5/2011 | Keeler et al. |
| 2011/0119249 A1 | 5/2011 | Flatz |
| 2011/0228325 A1 | 9/2011 | Shiraishi |
| 2011/0302151 A1 | 12/2011 | Abadi |
| 2012/0005509 A1 | 1/2012 | Araki |
| 2012/0014265 A1 | 1/2012 | Schlansker |
| 2012/0054225 A1 | 3/2012 | Marwah et al. |
| 2012/0071152 A1 | 3/2012 | Roundtree |
| 2012/0159448 A1 | 6/2012 | Arcese |
| 2012/0166447 A1 | 6/2012 | Nice |
| 2012/0197868 A1 | 8/2012 | Fauser |
| 2012/0209873 A1 | 8/2012 | He |
| 2012/0234908 A1 | 9/2012 | Wang |
| 2012/0310916 A1 | 12/2012 | Abadi |
| 2013/0151458 A1 | 6/2013 | Indeck |
| 2013/0151567 A1 | 6/2013 | Ellison et al. |
| 2013/0151568 A1 | 6/2013 | Ellison et al. |
| 2013/0275364 A1 | 10/2013 | Wang |
| 2013/0275473 A1 | 10/2013 | Ellison et al. |

(56) References Cited

U.S. PATENT DOCUMENTS

| | | | |
|---|---|---|---|
| 2013/0275612 A1* | 10/2013 | Voss | H04L 65/60 709/231 |
| 2013/0303663 A1 | 11/2013 | Agnely et al. | |
| 2014/0013076 A1 | 1/2014 | Ganesh et al. | |
| 2014/0013077 A1 | 1/2014 | Ganesh et al. | |
| 2014/0013078 A1 | 1/2014 | Ganesh et al. | |
| 2014/0052713 A1 | 2/2014 | Schauer et al. | |
| 2014/0052726 A1 | 2/2014 | Amberg et al. | |
| 2014/0068183 A1 | 3/2014 | Joshi | |
| 2014/0074818 A1 | 3/2014 | Barber | |
| 2014/0095748 A1 | 4/2014 | Aingaran et al. | |
| 2014/0096145 A1 | 4/2014 | Aingaran et al. | |
| 2014/0208138 A1 | 7/2014 | Homchaudhuri | |
| 2014/0208331 A1 | 7/2014 | Li | |
| 2014/0214796 A1 | 7/2014 | Barber | |
| 2014/0279838 A1 | 9/2014 | Tsirogiannis | |
| 2014/0281354 A1 | 9/2014 | Tkacik | |
| 2015/0046411 A1 | 2/2015 | Kazmaier | |
| 2015/0074384 A1 | 3/2015 | Yajima | |
| 2015/0088926 A1 | 3/2015 | Chavan et al. | |
| 2015/0120698 A1 | 4/2015 | Plattner | |
| 2015/0181273 A1 | 6/2015 | Shaool | |
| 2015/0227585 A1 | 8/2015 | Braham | |
| 2015/0261535 A1 | 9/2015 | Snyder, II | |
| 2016/0007037 A1 | 1/2016 | Zhao et al. | |
| 2016/0019064 A1 | 1/2016 | Brooks et al. | |
| 2016/0246811 A1 | 8/2016 | Ackerman | |
| 2016/0253379 A1 | 9/2016 | Ford | |
| 2016/0285623 A1 | 9/2016 | Yoon | |
| 2016/0350347 A1 | 12/2016 | Das et al. | |
| 2016/0352342 A1 | 12/2016 | Fujiwara | |
| 2017/0024435 A1 | 1/2017 | Kociubes et al. | |
| 2017/0039238 A1 | 2/2017 | Elias | |
| 2017/0060587 A1 | 3/2017 | Chavan | |
| 2017/0085378 A1 | 3/2017 | Shields | |
| 2017/1085527 | 4/2017 | Ueda | |
| 2017/0185527 A1 | 6/2017 | Ueda | |
| 2017/0270052 A1* | 9/2017 | Brown | G06F 9/30105 |
| 2017/0270053 A1 | 9/2017 | Brown | |
| 2017/0272231 A1 | 9/2017 | Chen | |
| 2017/0322725 A1 | 11/2017 | Klingenberg | |
| 2018/0004242 A1 | 1/2018 | Suresh | |
| 2018/0004581 A1 | 1/2018 | Brown | |
| 2018/0067889 A1 | 3/2018 | Brown | |
| 2018/0101530 A1 | 4/2018 | Brown | |
| 2018/0107627 A1 | 4/2018 | LeBeane et al. | |
| 2018/0232417 A1 | 8/2018 | Das | |

FOREIGN PATENT DOCUMENTS

| | | |
|---|---|---|
| CN | 10930358 A | 12/2010 |
| CN | 10217695 A | 8/2011 |
| EP | 1 111 500 A1 | 3/1996 |
| EP | 2040180 A1 | 3/2009 |
| EP | 2423843 A1 | 2/2012 |
| GB | 2 306 868 A | 5/1997 |
| GB | 2338095 A | 12/1999 |
| JP | 2000261674 A | 9/2000 |
| WO | WO 00/08552 A1 | 2/2000 |
| WO | WO2010/039895 | 4/2010 |
| WO | WO 2013/095653 A1 | 6/2013 |
| WO | WO 2013/095662 A1 | 6/2013 |

OTHER PUBLICATIONS

Chavan, U.S. Appl. No. 15/211,418, filed Jul. 15, 2016, Office Action, dated May 4, 2018.
Brooks, U.S. Appl. No. 14/867,929, filed Sep. 28, 2015, Interview Summary, dated Apr. 25, 2018.
Brooks, U.S. Appl. No. 14/867,929, filed Sep. 28, 2015, Final Office Action, dated May 31, 2018.
Brown, U.S. Appl. No. 15/197,436, filed Jun. 29, 2016, Final Office Action, dated Jun. 11, 2018.
Kociubes U.S. Appl. No. 14/806,576, filed Jul. 22, 2015, Interview Summary, dated Feb. 14, 2018.
Das, U.S. Appl. No. 14/806,614, filed Jul. 22, 2015, Interview Summary, dated Jan. 17, 2018.
Brown, U.S. Appl. No. 15/362,688, filed Nov. 28, 2016, Notice of Allowance, dated Apr. 25, 2018.
Brown, U.S. Appl. No. 15/073,905, filed Mar. 18, 2016, Notice of Allowance, dated Apr. 24, 2018.
Ganesh, U.S. Appl. No. 14/023,064, filed Sep. 10, 2013, Notice of Allowance, dated Jun. 16, 2017.
Chavan, U.S. Appl. No. 14/3385,219, filed Jul. 22, 2014, Office Action, dated Jun. 2, 2017.
Brooks, U.S. Appl. No. 14/867,929, filed Sep. 28, 2015, Office Action, dated Jul. 13, 2017.
U.S. Appl. No. 13/590,110, filed Aug. 20, 2012, Office Action, dated Dec. 18, 2013.
U.S. Appl. No. 13/590,057, filed Aug. 20, 2012, Advisory Aciton, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,057, filed Aug. 20, 2012, Office Action, dated Apr. 22, 2015.
U.S. Appl. No. 13/590,057, filed Aug. 20, 2012, Office Action, dated Jul. 1, 2014.
U.S. Appl. No. 13/590,110, filed Aug. 20, 2012, Final Office Action, dated Mar. 27, 2015.
U.S. Appl. No. 13/590,110, filed Aug. 20, 2012, Office Action, dated Apr. 14, 2016.
U.S. Appl. No. 13/590,0547, filed Aug. 20, 2012, Advisory Action, dated Feb. 11, 2016.
U.S. Appl. No. 13/590,110, filed Aug. 20, 2012, Office Action, dated Oct. 2, 2015.
U.S. Appl. No. 13/590,057, filed Aug. 20, 2012, Advisory Action, dated Feb. 11, 2016.
U.S. Appl. No. 13/590,110, filed Aug. 20, 2012, Notice of Allowance, dated Aug. 1, 2016.
U.S. Appl. No. 14/023,064, filed Sep. 10, 2013, Final Office Action, dated Oct. 6, 2016.
U.S. Appl. No. 14/023,064, filed Sep. 10, 2013, Office Action, dated Mar. 28, 2016.
U.S. Appl. No. 14/023,249, filed Sep. 10, 2013, Office Action, dated Jan. 20, 2016.
U.S. Appl. No. 14/023,249, filed Sep. 10, 2013, Office Action, dated Aug. 25, 2016.
U.S. Appl. No. 13/590,057, filed Aug. 20, 2012, Office Action, dated Jan. 7, 2014.
U.S. Appl. No. 13/590,110, filed Aug. 20, 2012, Office Action, dated Jul. 1, 2014.
Ganesh, U.S. Appl. No. 14/023,249, filed Sep. 10, 2013, Notice of Allowance, dated Feb. 27, 2017.
Chavan, U.S. Appl. No. 14/338,219, filed Jul. 22, 2014, Restriction Requirement, dated Jan. 13, 2017.
Das, U.S. Appl. No. 15/945,733, filed Apr. 4, 2018, Notice of Allowance, dated Nov. 16, 2018.
Chavan, U.S. Appl. No. 15/211,418, filed Jul. 15, 2016, Notice of Allowance, dated Oct. 31, 2018.
Brown, U.S. Appl. No. 15/290,357, filed Oct. 11, 2016, Interview Summary, dated Dec. 4, 2018.
Brown, U.S. Appl. No. 15/256,936, filed Sep. 6, 2016, Interview Summary, dated Dec. 19, 2018.
Das, U.S. Appl. No. 14/806,614, filed Jul. 22, 2015, Office Action, dated Dec. 6, 2017.
Brown, U.S. Appl. No. 15/197,436, filed Jun. 29, 2016, Office Action, dated Nov. 29, 2017.
Chavan, U.S. Appl. No. 14/338,219, filed Jul. 22, 2014, Notice of Allowance, dated Sep. 25, 2017.
Chavan, U.S. Appl. No. 14/338,219, filed 04Jul. 22, 2014, Interview Summary, dated Sep. 11, 2017.

(56) References Cited

OTHER PUBLICATIONS

Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
Brown, U.S. Appl. No. 15/290,357, filed Oct. 11, 2016, Final Office Action dated Feb. 15, 2019.
Brown, U.S. Appl. No. 15/290,357, filed Oct. 11, 2016, Advisory Action dated Mar. 15, 2019.
Brown, U.S. Appl. No. 15/197,436, filed Jun. 29, 2016, Interview Summary dated Feb. 25, 2019.
Brooks, U.S. Appl. No. 14/867,929, filed Sep. 28, 2015, Office Action dated Mar. 18, 2019.
Brown, U.S. Appl. No. 15/290,357, filed Oct. 11, 2016, Final Office Action dated Nov. 26, 2019.
Jain, U.S. Appl. No. 15/362,673, filed Nov. 28, 2016, Notice of Allowance dated Jun. 14, 2019.
Brown, U.S. Appl. No. 15/256,936, filed Sep. 6, 2016, Suplemental Notice of Allowability dated May 24, 2019.
Brown, U.S. Appl. No. 15/256,936, filed Sep. 6, 2016, Notice of Allowance dated Mar. 29, 2019.
Brown, U.S. Appl. No. 15/290,357, filed Oct. 11, 2016, Notice of Allowance dated May 13, 2020.

\* cited by examiner

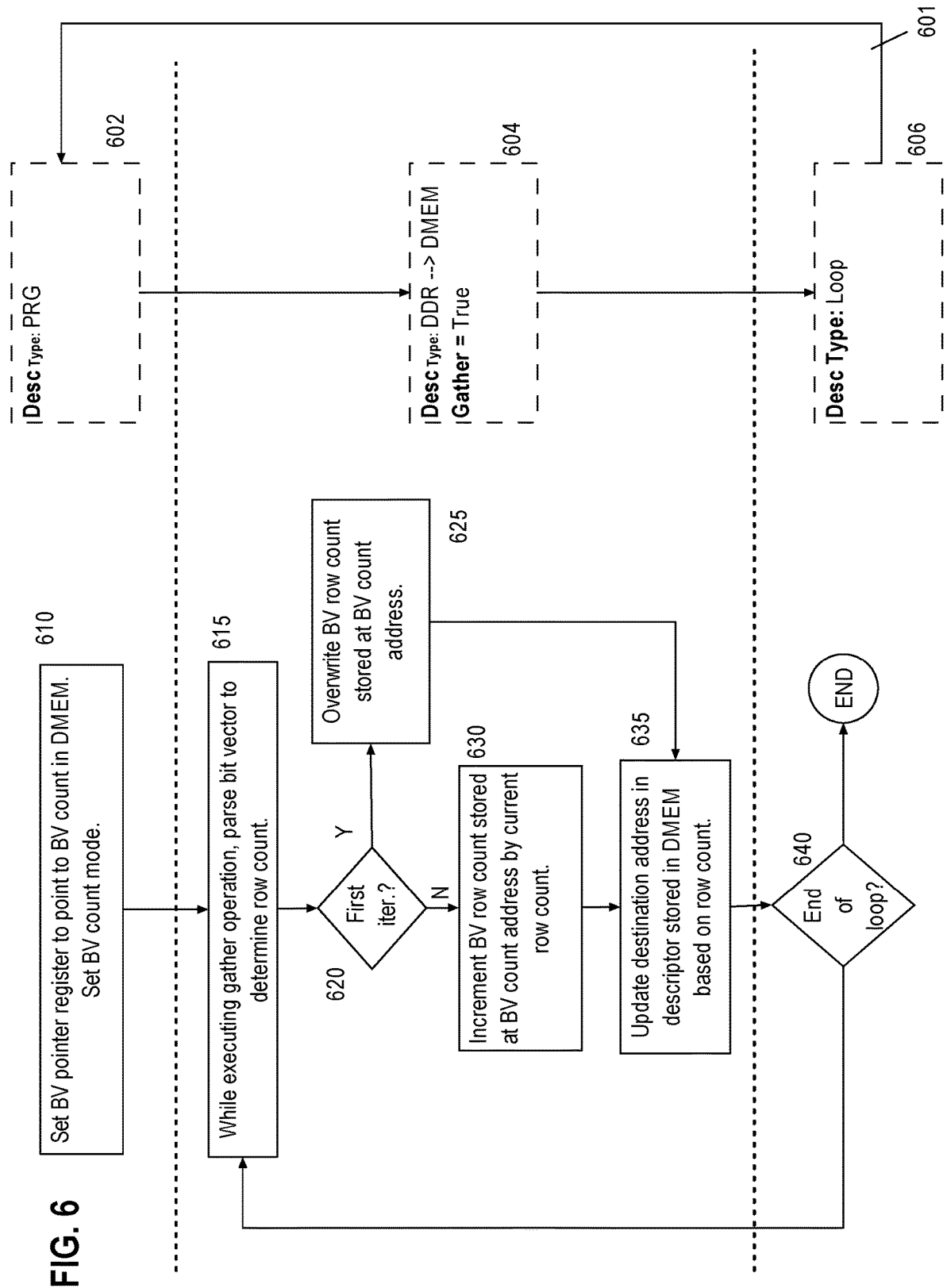

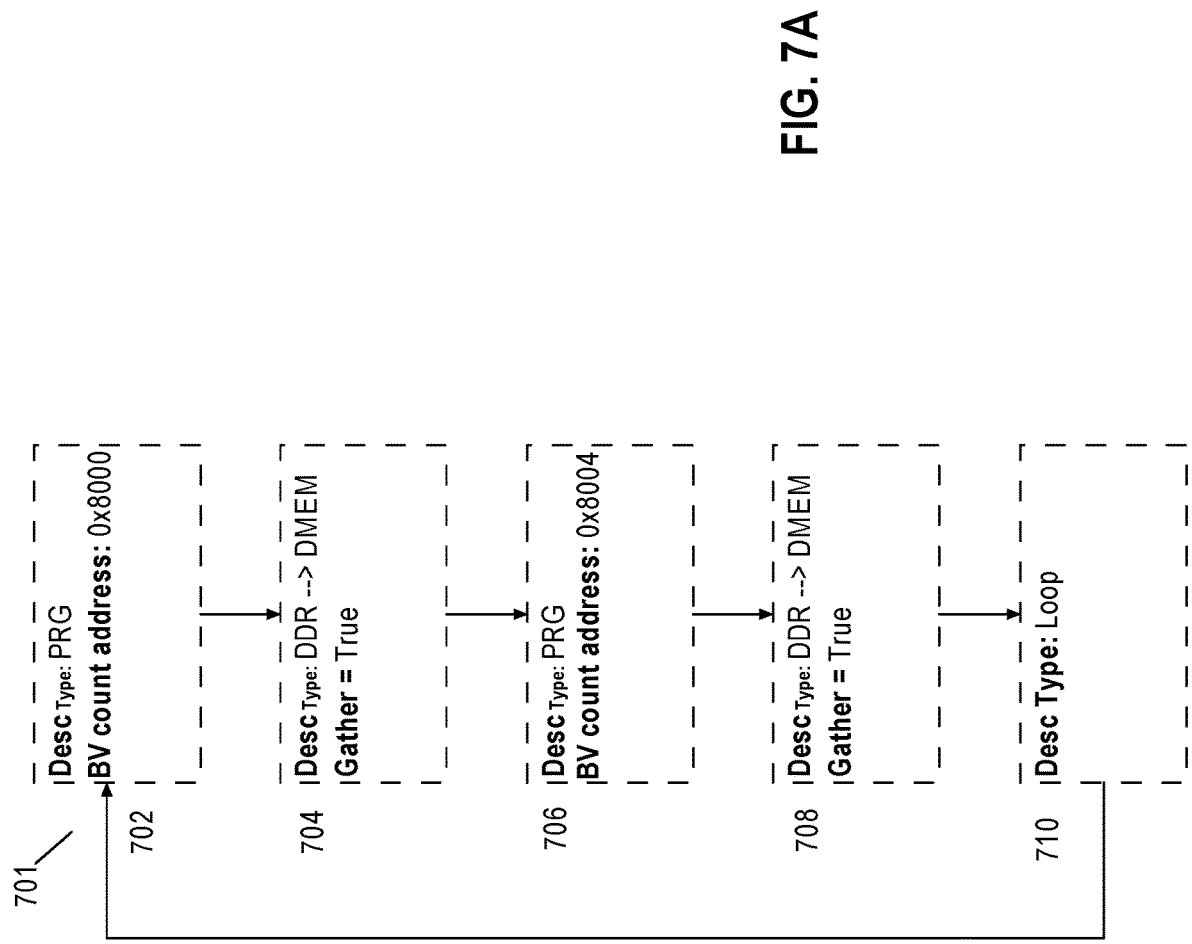

BIT VECTOR GATHER ROW COUNT CALCULATION AND HANDLING IN DIRECT MEMORY ACCESS ENGINE

CROSS-REFERENCE TO RELATED APPLICATIONS

The present application is related to U.S. patent application Ser. No. 15/073,905, entitled Tuple Encoding Aware Direct Memory Access Engine For Scratchpad Enabled Multi-Core Processors, filed on Mar. 18, 2015, by David Brown, et al., the entire contents of which are incorporated herein by reference. The present application is related to U.S. patent application Ser. No. 15/362,688, entitled Database Tuple-Encoding-Aware Data Partitioning in a Direct Memory Access Engine, filed Nov. 28, 2016 by David A. Brown, the entire contents of which are incorporated herein by reference, and which is referred to herein as the Partitioning Application.

FIELD OF INVENTION

The technical field relates to data movement by a hardware data movement system.

BACKGROUND

Database servers that execute on multi-core processors perform data manipulation operations on large amounts of tabular data. Tabular data is data that is logically organized as rows and one or more columns, each column having a certain size, each row including each column. Logically, tabular data resides in a table-like structure, such as a spreadsheet or relational table. However, the actual physical storage of the tabular data may take a variety of forms. For example, in row major format, tabular data may be stored as rows that are stored contiguously within a memory address space, each row including each column and a given column occupying the same number of bytes within a row. In column major format, each column may be separately stored from other columns as a column vector stored contiguously within a memory address space, the particular entry for each row in a column vector being stored in the same relative position or index of the respective column vector of each other column.

Various data manipulation operations manipulate a source column to generate a resultant column that has less rows than the source column. An example of such a data manipulation operation is a gather operation. A gather operation filters out rows based on filtering data specifying which rows to filter. A bit vector is an example of filtering data. An important function or operation performed in conjunction with a gather operation that generates a resultant column with less rows is to determine the number of rows in the resultant column. Discussed herein are approaches for determining the number of rows in the resultant column of a gather operation.

BRIEF DESCRIPTION OF THE DRAWINGS

In the drawings:

FIG. 6 illustrates a descriptor-based algorithm for performing a hardware accelerated gather operation that includes generating a row count, and illustrates operations performed thereto, according to an embodiment of the present invention.

FIG. 7A illustrates a descriptor loop for performing a hardware accelerated gather operation that includes generating multiple row counts.

DETAILED DESCRIPTION

Figure 1:
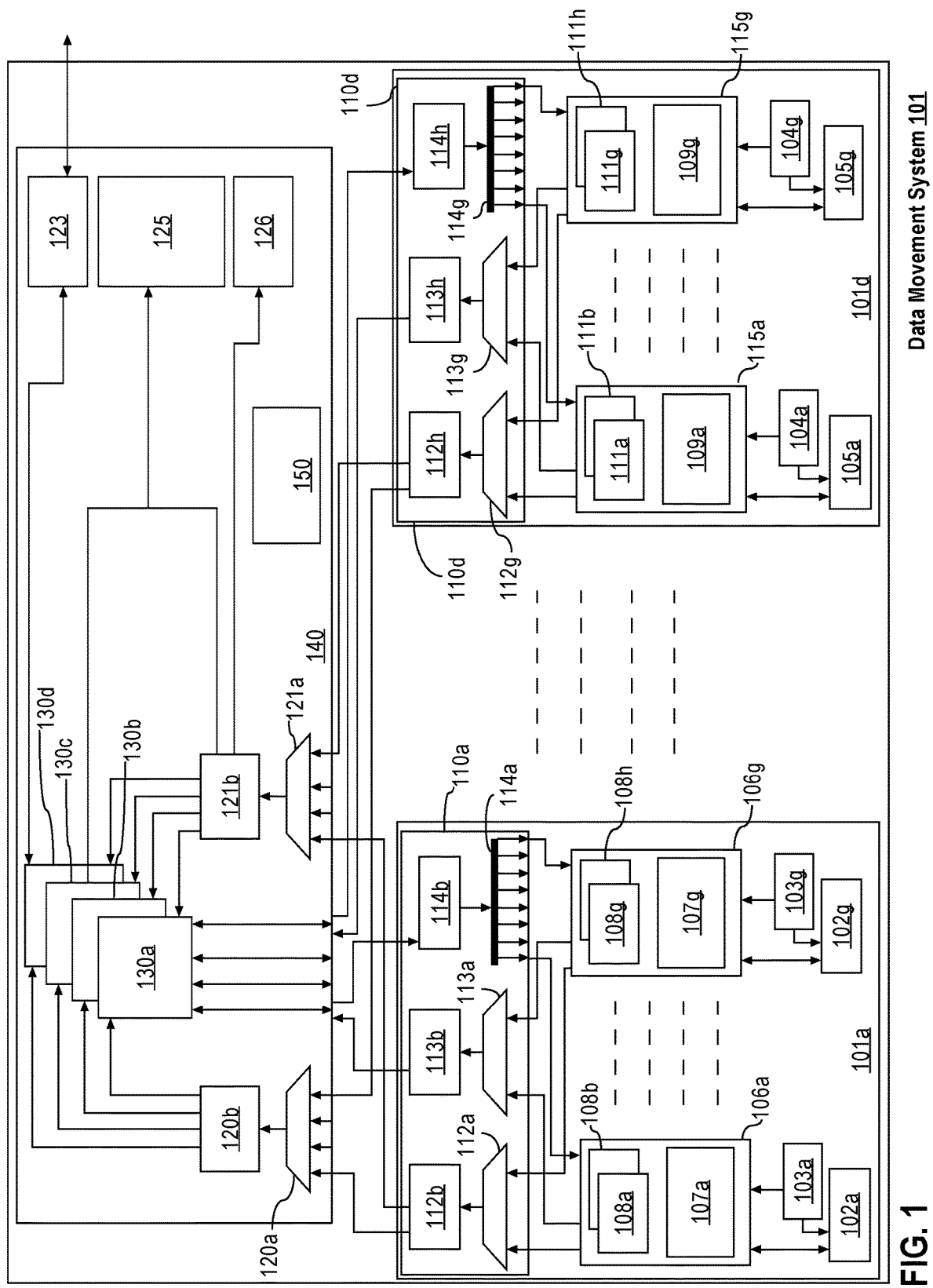
FIG. 1 illustrates an example arrangement of a plurality of electronic circuits of the data movement system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The number of rows moved by a bit vector (BV) based gather operation can be generated using a software-based approach. During a BV based gather operation, only those rows that have their corresponding bit positions set in the BV are transferred. Under a software-based approach for calculating a number of rows moved, a core processor performs, using multiple instructions, a bitwise shift on a BV to determine if a particular bit position is set. When a set bit is found, the core processor increments a counter that the core processor maintains to track the number of rows that are expected to be moved as part of the BV gather operation. Executing software to count the number of rows transferred requires a significant number of instruction cycles on the core processor. The number of instruction cycles is exacerbated in a gather operation that processes a large number of rows.

The approaches described herein integrate row counting with a hardware accelerated gather operation performed by a data movement system while moving data from a main memory to a scratch pad memory of a core processor. This approach eliminates the need for a software-based approach to calculate a row count of the number of rows moved. A hardware accelerated generation of a row count is also used to improve various aspects of a gather operation and aspects of other hardware accelerated operations performed by the data movement system.

According to an embodiment, a hardware accelerated gather operation with row counting is performed by a data movement system that provides a robust infrastructure for not only performing a BV based gather operation, but also moving data and performing various other kinds of data manipulation operations. Therefore, a detailed overview of the data movement system (also referred to as DMS) is described, followed by a detailed description of approaches to hardware accelerated gather operations and row counting.

Data Movement System

The approaches described herein provide for hardware accelerated movement of tabular data by a data movement system between a source memory location and a destination memory location without executing software programs to move the tabular data. Additionally, the techniques also provide for performing one or more data manipulation operations, again without executing software programs, on the tabular data while the data is in flight to the destination memory location. In other words, data manipulation operations will typically be performed within the same clock cycles that are used in transmitting the data to the destination memory location and prior to storing the tabular data at the destination memory location. Consequently, the tabular data stored in the destination memory location is the tabular data resulting from the data manipulation operations. Therefore, the core processor can avoid spending additional clock cycles in manipulating the tabular data.

In an embodiment, in response to a particular memory location being pushed or stored into a first register within a first register space that is accessible by a first set of electronic circuits, the first set of electronic circuits access a descriptor stored at the particular memory location. The descriptor may indicate a source memory location of where the said tabular data is stored, and the descriptor may also indicate a destination memory location to store the result of a data manipulation operation. The destination memory location may be within a memory that is local to the core data processor that programmed the descriptor. With the memory being local to the core data processor, the distance between the core data processor and the memory is short, therefore the latency in accessing the tabular data from the destination memory location is reduced. Performance of the core processor in accessing the tabular data is improved.

The descriptor may also indicate a width of a column of tabular data, wherein the tabular data comprises columns and rows, a number of rows of tabular data. By describing the tabular data to be moved in terms of number of rows and width of the column of tabular data, the descriptor specifies to the data movement system how a database column of a database table is formatted and stored at the source memory location. Different columns of the database table may be specified by different descriptors, thus the data movement system is fully aware of how database tables are formatted and stored at the source memory locations. Therefore, the data movement system is always optimized to access tabular data from a source memory location and store it in a destination memory location, depending on how the tabular data is formatted and organized at the source memory location.

The descriptor may also indicate one or more tabular data manipulation operations to perform on the column of data. An example of a tabular data manipulation operation may be a type of filtering operation, described herein as a gather operation. The descriptor may indicate that a gather operation should be performed on the tabular data. The descriptor may also specify a memory location of a bit vector within the local memory. The data movement system, described herein, uses the bit vector specified by the descriptor to filter out rows of the column of tabular data that do not satisfy the filtering criteria. The data movement system filters out rows of the column of tabular data while the data is in flight to the destination memory location or prior to the tabular data being stored in the destination memory location, and compacts the resulting rows, the rows that were not filtered out, while storing the resulting rows in the destination memory location such that the resulting rows are stored in consecutive memory locations within destination memory even if the resulting rows were not stored in consecutive memory locations at the source memory location.

Therefore, the number of rows of the column of tabular data stored in the destination memory location after a gather operation is performed will likely be fewer than the number of rows specified by the descriptor. Thus, in addition to performance gain mentioned above, a more efficient usage of the limited storage space within a memory local to a core in multi-core processor is achieved.

Based on the descriptor, the first set of electronic circuits determine control information that indicate one or more data manipulation operations to perform on the tabular data. Using a hardware data channel, the first set of electronic circuits transmit the control information to a second set of electronic circuits to perform the one or more data manipulation operations. The second set of electronic circuits, according to the control information, retrieve the tabular data from a source memory location, and apply the one or more data manipulation operations to the tabular data to generate the data manipulation result and cause the data manipulation result to be stored at the destination memory location.

Once the tabular data is stored at the destination memory location, the techniques described herein allow the data movement system to notify the core processor that data is available in the destination memory by using event identifiers that are associated with a particular descriptor. The core processor is capable of handling these event identifiers without needing interrupt handlers, thus significantly reducing overhead costs of interrupt handlers.

The techniques described herein further allow the data movement system to begin processing the next descriptor. The data movement system may begin processing the next descriptor while the core processor processes the tabular data stored at the destination memory location. In other words, processing of the next descriptor and accessing and processing of tabular data stored may occur simultaneously. Therefore, the core processor may access and process data from the destination memory while the data movement system is moving tabular data for the next descriptor to a different destination memory location specified in that descriptor, thereby significantly improving the speed of processing data.

In other embodiments, the disclosure encompasses a data movement system and a computer apparatus to carry out the foregoing steps.

OVERVIEW OF THE DATA MOVEMENT SYSTEM

Core Processor and DMEM

FIG. 1 illustrates an example arrangement of a Data Movement System 101. FIG. 1 comprises a plurality of core processors 103a, 103g, 104a, 104g. Each of the core processors 103a, 103g, 104a, 104g are connected to a local high-speed scratch pad memory, such as a static random-access memory (SRAM), referred to herein as DMEM (Direct Memory). In FIG. 1, core processors 103a, 103g, 104a, 104g are connected to DMEM units 102a, 102g, 105a, 105g, respectively. Of all the core processors, only the processor that is connected to a particular DMEM may directly access that particular DMEM. Thus, DMEM 102a may be accessed by core processor 103a, but cannot be accessed by core processor 103g, 104a, 104g. DMEM 102g may be accessed by core processor 103g, but not by core processors 103a, 104a, 104g. Likewise, DMEM 105a may be accessed by core processor 104a, but not by core processors 103a, 103g, 104g and DMEM 105g may be accessed by core processor 104g, but cannot be accessed by core processors 103a, 103g, 104a.

Direct Memory Access Complex (DMAC)

The data movement system described herein comprises three major functional blocks, Direct Memory Access Complex (DMAC), Direct Memory Access X-Bar (DMAX) and Direct Memory Access DMEM (DMAD). The data movement system described herein comprises only one DMAC block and several DMAX and DMAD blocks. The DMAC comprises several complex data retrieval, load and manipulation engines. The DMAX blocks mainly comprise data routing engines and the DMAD blocks mainly comprise data decoding engines and descriptor channel blocks.

The data movement system described herein comprises one DMAD block per core, therefore the number of the DMAD blocks depend upon the number of cores utilized in the data movement system. For example, in a data movement system in a 32 core processor system, the number of DMAD blocks is 32. In an embodiment, several DMAD blocks may be configured to route data and instructions to one DMAX block. Continuing with the example of the 32 core processor, 8 DMAD blocks may be configured to route data and instructions to one DMAX block, thereby resulting in 4 DMAX blocks to serve 32 DMAD blocks of 32 cores.

The data movement system described herein comprises only a single DMAC. The single DMAC processes data and instructions, routed via DMAX, from all DMAD blocks of the data movement system. The DMAC comprises engines that perform complex functions and due to their complexity, require the highest gate count, area and power relative to the engines within DMAX and DMAD blocks. Therefore, the DMAC impacts the total cost of the data movement system more than DMAX and DMAD blocks. However, by sharing the DMAC resources across the DMAX and DMAD blocks, the cost of a DMAC to the data movement system is amortized. Thus, the total cost of the data movement system, in terms of gate count, area and power, is substantially lower than alternative approaches described above.

In an embodiment, the data movement system described herein is implemented on a single chip. Thus, for each core processor, the DMEM connected to each of the core processors, the DMAD block for each of the core processors, DMAX blocks and the DMAC block are all designed, implemented and configured on a single chip. A bus interconnects all the functional blocks of the data movement system in the chip.

FIG. 1 depicts Direct Memory Access Complex (DMAC) 140 and several major engines of DMAC 140. The details and workings of DMAC 140 and its engines are described further below.

Direct Memory Access DMEM (DMAD)

Each of the core processors, 103a, 103g, 104a, 104g, is connected to DMAD 106a, 106g, 115a, 115g, respectively. Each DMAD comprises a group of electronic circuits that have been designed to receive instructions from the core processor connected to the particular DMAD. For example, DMAD 106a is designed to receive instructions from core processor 103a only.

A core processor sends instructions to a DMAD by programming a set of commands, herein referred to as a descriptor. A descriptor describes movement of data from one location to another location through a plurality of fields. Some of the fields in the descriptor may include a descriptor type, a source address location that indicates the source location for the tabular data to be moved from, a destination address location that indicates the destination location for the tabular data from the source location to be copied to, the size of the column of tabular data to be operated on, the number of rows of the column of tabular data that need to be copied, one or more data manipulation operations and wait-for event identifiers and other control flags.

Once the core processor programs the descriptor, the core processor stores the descriptor at a location in the DMEM. For example, core processor 103a upon programming the descriptor, stores it in DMEM unit 102a. Core processor 103a then sends the descriptor to DMAD 106a by transmitting the memory location of the descriptor within the DMEM unit 102a onto one of the two hardware data channels of DMAD 106a. A core processor transmits the memory location of a descriptor onto a data channel by storing the memory location into a register. In an embodiment, the register maybe designed to be a first-in-first-out or FIFO register such that the first memory location that is pushed or stored into the register will be the first memory location that is added into a hardware managed list of one of the two hardware data channels.

DMEM Interface Block

Each DMAD comprises a DMEM interface block that is configured to store any data destined for the DMEM unit coupled with its DMAD, and generate a write request for the DMEM unit coupled with its DMAD to store the data transmitted to its DMAD in the DMEM unit coupled with its DMAD. For example, DMAD 106a comprises DMEM interface block 107a. DMEM interface block 107a is a group of electronic circuits that have been designed to store data transmitted to DMAD 106a and destined for DMEM unit 102a in one of the registers accessible by DMEM interface block 107a. Additionally, the group of electronic circuits of DMEM interface block 107a have also been designed to generate a write request, for DMEM unit 102a, to store the data destined for DMEM unit 102a. DMAD 106g, 115a, and 115g similarly comprise DMEM interface blocks 107g, 109a, 109g respectively.

The DMEM interface block is also configured to read or retrieve data from the DMEM unit coupled with its DMAD. The DMEM interface block may generate a read request, using a DMEM unit location, to read or retrieve data from the DMEM unit location. The DMEM interface block may receive a read request to read or retrieve data from a particular DMEM unit location and in response the DMEM interface block may read or retrieve data from the particular DMEM unit location. The DMEM interface block may transmit the read or retrieved data to the hardware component within its DMAD that requested that data. The DMEM interface block may receive a write request to write or store data at a particular DMEM unit location and in response the DMEM interface block may write or store data at the particular DMEM location in the DMEM unit coupled with the DMAD of the DMEM interface block. Each of DMEM interface blocks 107a, 107g, 109a, 109g, depicted in FIG. 1, are designed to perform the above operations with DMEM units 102*a*, 102*g*, 105*a*, and 105*g*, respectively.

Descriptor Channel Block of DMAD

Each DMAD comprises a Descriptor Channel Block, which is a subset of electronic circuits of the DMAD that are designed to determine the hardware data channel to which the descriptor will be added. In an embodiment, each DMAD may be designed to maintain two hardware data channels, and may have two Descriptor Channel Blocks, one for each of the hardware data channels. For example, DMAD 106*a* is designed to maintain two hardware data channels. Descriptor Channel Blocks 108*a* and 108*b* are the two descriptor channel blocks of DMAD 106*a*. Similarly, DMAD 106*g* comprises Descriptor Channel Blocks 108*g*, 108*h*, DMAD 115*a* comprises Descriptor Channel Blocks 111*a*, 111*b* and DMAD 115*g* comprises Descriptor Channel Blocks 111*g*, 111*h*.

Each Descriptor Channel Block maintains two hardware managed lists, an active list and a free list, per hardware data channel. In an embodiment, the hardware managed active list and free list are linked lists. Once the core processor stores the DMEM location of the descriptor into the FIFO register, the Descriptor Channel Block of the DMAD connected to the core processor transmits the DMEM location of the descriptor from the FIFO register to one of the hardware data channels. In an embodiment, once the DMEM location of a descriptor is stored into a FIFO register, the Descriptor Channel Block determines the number of descriptors that are assigned to be processed on that particular hardware data channel and if the number of descriptors that are assigned to be processed on that particular hardware data channel is greater than zero, then the Descriptor Channel Block adds the new descriptor identified by the newly pushed or stored DMEM location in the FIFO register to the active list of that particular hardware data channel. The Descriptor Channel Block adds the new descriptor to the active list by transmitting instructions to the DMAD to write the DMEM location of the new descriptor to the Link Address field of the last descriptor that was added to that particular hardware data channel.

The Descriptor Channel Block begins processing a descriptor by storing the DMEM location of the descriptor into a register that has been designated as the register from which the Descriptor Channel Block is designed to read from and start processing the next available descriptor, referred herein as the Next Descriptor to Read register. If the active list is empty, then the Descriptor Channel Block stores the DMEM location from the FIFO register into the Next Descriptor to Read register. If the active list is not empty, then the Descriptor Channel Block adds the descriptor, stored at the DMEM location from the FIFO register, to the end of the active list by updating the Link Address field value of the descriptor previously at the end of the active list to contain the DMEM location value from the FIFO register.

In an embodiment, a register, described herein as the Last Descriptor List register, accessible by the Descriptor Channel Block comprises the DMEM location of the descriptor that is currently at the end of the active list. The Descriptor Channel Block adds a new descriptor to the active list by storing or writing the DMEM location from the FIFO register as the value of the Link Address field of the descriptor currently at the end of the list and storing the DMEM location value from the FIFO register in the Last Descriptor List register. The Descriptor Channel Block then traverses through the active list using the Link Address field of the descriptor that is currently being processed.

Once the DMEM location of a Descriptor is stored in the Next Descriptor to Read register, the Descriptor Channel Block, using the DMEM location stored in the register, retrieves the data of the descriptor available at that DMEM location from the DMEM. The Descriptor Channel Block transmits a request to read data from DMEM to the DMEM Interface Block of the DMAD. The request to read data includes the DMEM location of the descriptor. In an embodiment, the request to read data also specifies a number of bytes to read. In an embodiment the number of bytes to read equals the number of bytes that make up the entire descriptor or the total size of the descriptor. In an embodiment, the total size of a descriptor is 16 bytes. The DMEM Interface Block retrieves data from DMEM using the specified DMEM location and forwards the data to the Descriptor Channel Block. The Descriptor Channel Block decodes the descriptor data including, but not limited to, determining the type of the descriptor. The Descriptor Channel Block determines the type of the descriptor and processes the descriptor based at least on the type of the descriptor.

Descriptor Types

According to an embodiment, there are at least three types of descriptors, which are data descriptors, control descriptors, auxiliary descriptors. The type of the descriptor is indicated by a descriptor type field within the descriptor data. There are multiple variations within each type of descriptor. Data descriptors specify how Data Movement System moves data from one memory location to another memory location, and the data is transformed during movement.

Control descriptors provide information for looping through one or more descriptors more than once. Additional control descriptors include (1) descriptors that may be used to program certain configurations within the data movement system, referred to herein as program descriptors, (2) descriptors that may be used to control event registers in the data movement, referred to herein as event descriptors, and (3) descriptors that may assist with partitioning of tabular data, referred to herein as hash and range engine descriptors.

Auxiliary descriptors provide information that assist in the processing of another descriptor. For example, the auxiliary descriptor may be used to provide additional control information if the size of the required control information exceeds more than the maximum size allowed for the control information.

Data descriptors, auxiliary descriptors and control descriptors that affect registers or control state in the Direct Memory Access Complex (DMAC) 140 are forwarded to DMAC. Control descriptors that affect the registers in a DMAD, that indicate loop mechanisms of one or more descriptors, or other control descriptors that do not need to be sent to DMAC, or that affect registers designed to store data corresponding to wait for events are further processed by the Descriptor Channel Block.

Direct Memory Access X-Bar (Cross-Bar)

Descriptors are forwarded to DMAC by forwarding the data of the descriptors to Direct Memory Access Cross(X)-Bar (DMAX) 110*a*, 110*d*. DMAX comprises electronic circuits that are configured to control and route data flow from a DMAD to a DMAC and from the DMAC to the DMAD. In an embodiment, the electronic circuits of a DMAX may be grouped into 3 groups. One group of electronic circuits may be designed to transmit all control information of descriptors from the DMAD to the DMAC, while another group of electronic circuits may be designed to transmit, from the DMAD to the DMAC all data corresponding to a response of a read request from the DMAC to the DMAD to read data from the DMEM. The third group of electronic circuits may be designed to transmit a read request from DMAC to DMAD to read data from the DMEM. Additionally, the third group of electronic circuits may be designed to transmit all descriptors return paths from the DMAC to the DMAD, wherein each descriptor return path comprises identifiers associated with a descriptor that indicate the DMAD to which the descriptor belongs to, the descriptor channel block within that DMAD that processed the descriptor and an identifier of that descriptor.

For example, DMAX 110a comprises an arbitration unit, such as the arbitration unit 112a and a FIFO register 112b for transmitting data from DMAD 106a to DMAC 140. In an embodiment, data includes control information of a descriptor which may be used by the arbitration unit 112a in selecting one of the input data paths and transmitting data including the control information into the FIFO register 112b. Similarly, DMAX 110a comprises FIFO register 114b and routing unit 114a to transmit data from the DMAC to the DMAD. In an embodiment, data transmitted from the DMAC may comprise control information such that routing unit 114a selects the data path for the target DMAD to transmit the data. DMAX 110a also comprises another arbitration unit 113a and a FIFO register 113b for transmitting data to be copied from DMEM to an external storage memory.

DMAX 110d comprises arbitration units 112g and 113g and routing unit 114g that provide the same functionality and perform the same functions as arbitration units 112a and 113a and routing unit 114a, respectively. DMAX 110d also comprises FIFO registers 112h, 113h and 114h that provide the same functionality and perform the same functions as 112b, 113b, 114b respectively.

Direct Memory Access Complex (DMAC)—Write Descriptor Parser

DMAC 140 comprises a write descriptor arbitration unit 120a, and the output of the write descriptor arbitration unit 120a is stored in the write descriptor parser logic block 120b. Write descriptor parser logic block 120b comprises one or more registers. Electronic circuits of write descriptor parser logic block 120b are designed to accumulate descriptor data and control information transmitted from a DMAX. In an embodiment, descriptor data from the DMAX may be transmitted in fragments, and electronic circuits of write descriptor parser logic block 120b may accumulate the various descriptor fields and reassemble the descriptor fields to form the complete descriptor data. Write descriptor parser logic block 120b determines the descriptor type of the descriptor and performs operations based on the descriptor type and the control information provided by the originating DMAD.

In response to determining that the descriptor is a data descriptor and in particular a write descriptor, write descriptor parser logic block 120b may modify the source address specified in the descriptor data using a source counter value provided by the originating DMAD. Additionally, write descriptor parser logic block 120b may also modify the destination address using a destination counter value provided by the originating DMAD. Write descriptor parser logic block 120b also transmits a data movement operation and the descriptor data to an appropriate data movement engine such as a DMEM load engine.

If the descriptor type is an auxiliary type descriptor, then write descriptor parser logic block 120b may update a local auxiliary data holding register and return the descriptor back to the originating DMAD. If the descriptor type is a program or control type descriptor, then write descriptor parser logic block 120b may store DMAC configuration data specified within the descriptor in the DMAC configuration register specified in the descriptor, and return the descriptor back to the originating DMAD.

Direct Memory Access Complex (DMAC)—Read Descriptor Parser

DMAC 140 also comprises a read descriptor arbitration unit 121a, and the output of the read descriptor arbitration unit 121a is read descriptor parser logic block 121b. Read descriptor parser logic block 121b comprises one or more registers. Electronic circuits of read descriptor parser logic block 121b are designed to accumulate descriptor data and control information transmitted from a DMAX. In an embodiment, descriptor data from a DMAX may be transmitted in fragments, and electronic circuits of read descriptor parser logic block 121b may accumulate the various descriptor fields and reassemble the descriptor fields to form the complete descriptor data. Read descriptor parser logic block 121b determines the descriptor type of the descriptor and performs operations based on the descriptor type and the control information provided by the origination DMAD.

In response to determining that the descriptor is a data descriptor and in particular a read descriptor, read descriptor parser logic block 121b may modify the source address specified in the descriptor data using a source counter value provided by the originating DMAD. Additionally, read descriptor parser logic block 121b may also modify the destination address using a destination counter value provided by the originating DMAD. Read descriptor parser logic block 121b also transmits a data movement operation and the descriptor data to an appropriate data movement engine such as a DDR load engine.

Similar to write descriptor parser logic block 120b, if the descriptor type is an auxiliary type descriptor, then read descriptor parser logic block 121b may update a local auxiliary data holding register and return the descriptor back to the originating DMAD. If the descriptor type is a program or control type descriptor, then read descriptor parser logic block 121b may store DMAC configuration data specified within the descriptor in the DMAC configuration register specified in the descriptor, and return the descriptor back to the originating DMAD.

Direct Memory Access Complex (DMAC)—Data Movement Engines

DMAC 140 comprises data movement engines 130a, 130b, 130c, 130d. Each of the data movement engines 130a, 130b, 130c, 130d, comprise one or more DMEM load engines and one or more DDR load engines. Each of the data movement engines 130a, 130b, 130c, 130d also comprise one or more DMEM store engine and one or more DDR store engines. Each data movement engine receives operations from write descriptor parser logic block 120b, and read descriptor parser logic block 121b. Data movement engines 130a, 130b, 130c, 130d execute these operations by copying data from the specified source memory and storing data in the specified destination memory. Each data movement engine also uses control information provided by the descriptor parser logic block to their execute operations.

Data movement engines 130a, 130b, 130c, 130d generate read requests to the specified source memory. Data movement engines 130a, 130b, 130c, 130d accumulate data transmitted to the data movement engine in response to the read request, and then generate write requests to the specified destination memory. In an embodiment, a buffering process is implemented such that data transmitted to data movement engines may be stored in a register block accessible by the data movement engines. Data movement engines begin processing data transmitted in response to the read request without waiting for the requested data to be available.

Electronic circuits of system bus interface master block 123 are designed to the receive read and write requests from the data movement engines 130a, 130b, 130c, 130d and translate them into system bus interface read requests and system bus interface write requests for memory units external to the data movement system, such as main memory or another memory unit. Electronic circuits of system bus interface master block 123 transmits data it receives in response to system bus interface read requests to the data movement engine that transmitted the read request. In an embodiment the system bus interface is AXI (Advanced Extensible Interface) and system bus interface master block 123 is an AXI master block.

Descriptor return block 125 is designed to return descriptors processed by write descriptor parser logic block 120b, read descriptor parser logic block 121b, and data movement engines 130a, 130b, 130c, 130d, to their originating DMAD.

DMS memory 150 comprises memory that various components of DMAC 140 may read from or write to. In general, DMS memory 150 is used to store data used by or generated by operations performed by the DMAC 140.

Supplemental Operation Engines 126 is representative of blocks of logic, each block performing a specific kind of operation on columns stored in DMS memory 150. For example, Supplemental Operation Engines 126 may include a partitioning engine that partitions tuples stored in one or more columns stored in DMS memory 150 among core processors in the data movement system. Such partitioning may include generating for each tuple an identifier identifying a co-processor to which the tuple is assigned by partitioning.

In addition, Supplemental Operation Engines 126 may include a hash engine. The hash engine generates hash values for one or more columns stored in DMS memory 150. Another example of an engine that may be included is a copy engine. The copy engine copies data between memory locations within DMS memory 150.

Moving Data and Performing Data Manipulation Operations Using Descriptors

Figure 2:
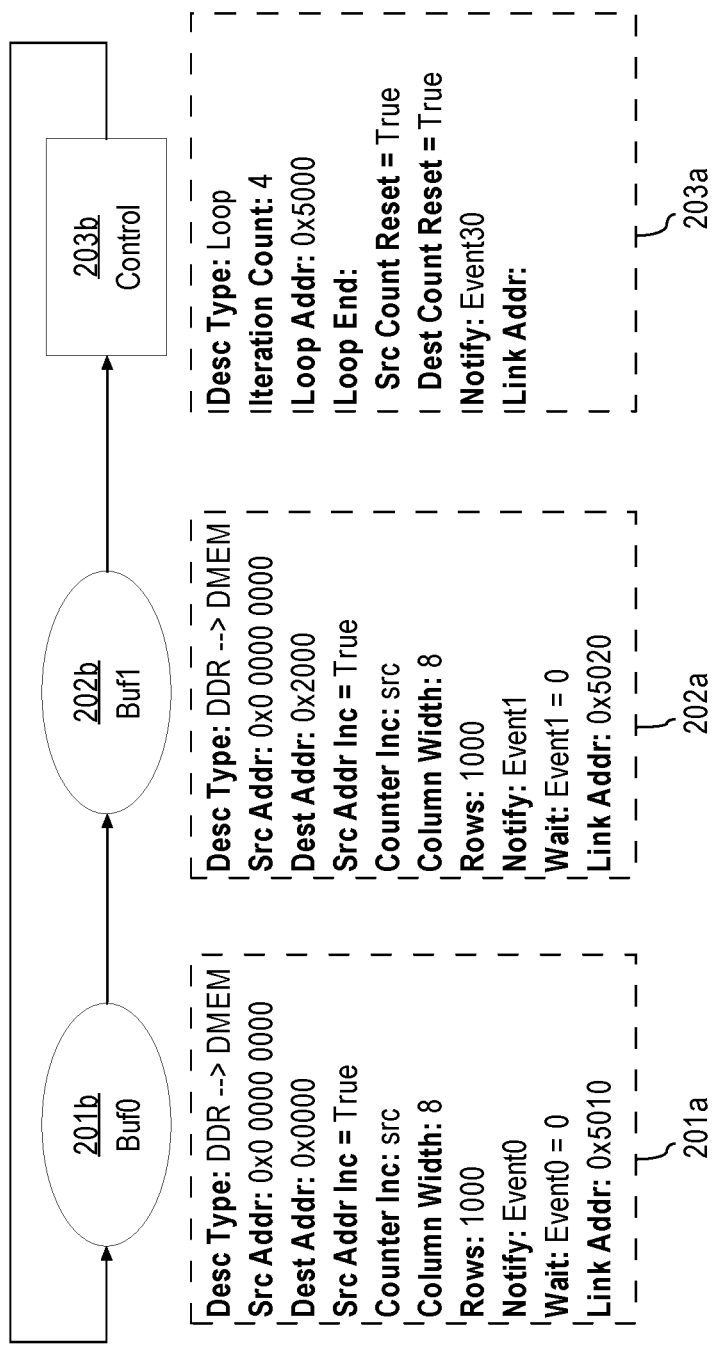
FIG. 2 illustrates an example of descriptors to move data from a source memory location to a destination memory location.

FIG. 2 illustrates an example method of moving data from a source memory location to a destination memory location using descriptors. FIG. 2 comprises three descriptors, 201a, 202a, 203a. Elements 201b, 202b and 203b each correspond to operations performed for descriptors 201a, 202a, 203a, respectively. The purposes of these elements is depict the order of operations performed for descriptors 201a, 202a, 203a.

FIG. 2 depicts a movement of ten thousand rows of data from a source memory location to a target memory location. In this example the source memory location is a double data rate synchronous dynamic random-access memory (DDR) and the target memory location is the DMEM connected to the core processor that programmed the descriptor, 102a and 103a respectively. In the example depicted in FIG. 2, descriptors 201a, 202a, 203a are programmed by core processor 103a.

Decoding Descriptor Data

Descriptors 201a and 202a are data descriptors. The descriptor type field of the descriptors indicates that descriptors 201a and 202a are data descriptors. In an embodiment, binary numbers may be used to depict each descriptor type and direction in which the data is to be moved. For example, binary number 0000 may be encoded in the electronic circuits of the descriptor channel block of the DMAD that is processing the descriptors to represent data movement from DDR memory to DMEM memory or DMEM. Similarly, data movement from DMEM to DDR memory may be represented by binary number 0001. For descriptors 201a and 202a, data is to be moved from DDR memory to DMS memory or DMEM memory. Therefore, descriptor type field of descriptor 201a, 202a indicate the appropriate field value. The value of the "Desc Type" field shown in FIGS. 201a and 202a is only for providing a clear illustrative example.

The core processor determines the source location of the source data along with the destination location of where the data is to be transmitted. The core processor also determines the number of rows that are to be processed at the source data location by a descriptor. In an embodiment, the core processor may be configured with a maximum number of rows that a descriptor is allowed to process. Such threshold limitation may be dynamically determined based on the size of DMEM or the available storage space in DMEM.

In FIG. 2, since the total number of rows of data that are to be processed is at least ten thousand rows, the core processor also programs a control descriptor that allows a DMAD to utilize the same descriptor numerous times. In other words the control descriptor allows electronic circuits of the DMAD to implement a loop mechanism until some condition within the control descriptor is not satisfied. Control descriptors that allow the DMAD to implement such a loop mechanism will be referred to herein as loop descriptors.

In an embodiment, a core processor may also be configured to utilize multiple buffers in the DMEM to store data from the source data location. Utilization of multiple buffers allows for the core processor to access the data stored in the DMEM faster and consequently process that data faster than using a single buffer because it allows the core processor to access data stored in one buffer while the data movement system is moving or storing data in the other buffers. The flexibility of specifying different destination memory locations in different descriptors allows for the utilization of multiple buffers.

As described herein, a buffer is said to be associated with a descriptor if the destination memory location specified in the descriptor is the starting memory location of the buffer. Each descriptor may represent only a fraction of the total number of rows of a column of tabular data that is being moved into a DMEM unit. Thus the buffer associated with a particular descriptor stores the fraction of the total number of rows of the column of tabular data and the core processor may begin processing the rows stored in the buffer without waiting for remaining number of rows of the column of tabular data being moved or stored into their respective buffers.

Additionally, the overhead costs from interrupt routines and interrupt handlers in switching control between the hardware components of the data movement system and the software executing on the core processor may be reduced by utilizing wait-for-events. The core processor may be configured to assign a particular event to a particular buffer in the DMEM and the values of the particular event will determine whether the hardware components of the data movement system will have access to the particular buffer or whether the software executing on the core processor will have access to the particular buffer.

In FIG. 2, descriptor 201a is assigned Event0. Based on the configuration, core processor 103a may either set Event0 to a value of 1 or 0 in order to allow the hardware components of the DMAD to process the descriptor. For example, if the electronic circuits of the DMAD 106a have been designed to begin the processing of the descriptor only if Event0 is set to be zero, then core processor 103a will set the Event0 value to 0 after core processor 103a programs the descriptor. Core processor 103a does not access that particular buffer until the value of Event0 is set to one. DMAD 106a will set the value of Event0 to 1 when the Buffer0 201b is full.

In FIG. 2, within the DMEM unit 102a, the data is being stored in two buffers, one at address 0x0000 and another at address 0x2000. As described above, using at least two buffers enables faster processing of data. Once the DMAD 106a and other hardware components of data movement system begin processing descriptor 201a, data associated with that descriptor will be stored in Buffer0 at address 0x0000 of DMEM unit 102a. Once Buffer0 has been filled with data, DMAD 106a will set the Event0 value to 1, which will indicate to core processor 103a that Buffer0 is ready to be accessed and data in Buffer0 is ready to be processed. After the processing of descriptor 201a is completed the first time, DMAD 106a and other hardware components of the data movement system will begin processing descriptor 202a. While the hardware components of the data movement system begin processing descriptor 202a, core processor 103a will be processing data from Buffer0. Therefore, using two data buffers allows for processing data records on a subset of data records without waiting for the entire set of data records to be retrieved first. Thus, reducing processing time and increasing processing speed.

In FIG. 2, descriptor 201a will be the first descriptor to be pushed on to one of the two hardware data channels of DMAD 106a and it will be the first descriptor among descriptors 201a, 202a, 203a to be processed. Descriptor 202a will be processed after descriptor 201a has begun processing and then descriptor 203a will be the last descriptor among the three descriptors to be processed, and descriptor 203a will be processed after descriptor 202a has begun processing. The core processor stores a descriptor in DMEM after programming the descriptor and in FIG. 2 core processor 103a stores descriptor 201a at address 0x5000, descriptor 202a at address 0x5010 and descriptor 203a at address 0x5020 of DMEM or DMEM unit 102a.

In FIG. 2, the "Src Addr" of descriptors 201a and 202a indicates the starting location of the column of data within the source memory where the tabular data is stored. "Dest Addr" of descriptors 201a and 202a indicates the location in DMEM where the data from the source memory will be stored. "Column Width" indicates the size of the data in the column of data in bytes and "Rows" indicates the number of rows that will be processed each time the data movement system is processing the descriptor 201a or 202a. A descriptor may comprise a "Src Auto Inc Allow" field, wherein the "Src Auto Inc Allow" field indicates to a descriptor parser logic block within the DMAC to modify the source address based on values of one or more other fields within the descriptor. In an embodiment, the one or more other fields within the descriptor include, the "Counter Inc" field, the "Column Width" field and the "Rows" field of the descriptor. The descriptor parser logic block may modify the source address specified in the descriptor using the source address specified in the descriptor as a starting point or a base source address and adding an offset value to the base source address, wherein the offset value is determined by the descriptor parser logic block based on the values of the source counter, the width of the column of tabular data that is being moved or copied from the source address specified in the descriptor and the number of rows of the column of tabular data that is being moved or copied from the source address specified in the descriptor.

As described above, the "Column Width" field of the descriptor specifies the width of the column of the tabular data and the "Rows" field of the descriptor specifies the number of rows of the column of tabular data. The value of the source counter may be read or retrieved from a register comprising the source counter. In some embodiments, the "Counter Inc" field of a descriptor specifies the register that comprises the source counter value. In some embodiments, the "Counter Inc" field indicates that the counter value that should be considered or used is the source counter value and the descriptor channel block is configured to retrieve the value stored in a particular register that comprises the source counter value. In some embodiments, the descriptor channel block is designed to retrieve a source counter value from a particular register that has been designated to store source counter value.

The value of the"Src Addr Inc" field determines whether or not a counter specified by the "Counter Inc" field should be incremented. In an embodiment, if the "Src Addr Inc" field is set then the counter specified by the "Counter Inc" field is incremented by a descriptor channel block processing the descriptor, and if the "Src Addr Inc" field is not set then the counter specified by the "Counter Inc" field is not incremented. In an embodiment, the descriptor channel block that is processing the descriptor increments the value of the counter specified by the "Counter Inc" field of a source counter associated with a descriptor channel block by the descriptor channel block.

In FIG. 2, the "Counter Inc" field of descriptor 201a specifies that the counter is the source counter of the descriptor channel block processing descriptor 201a, which in FIG. 2, as described above, is descriptor channel block 108a. The "Src Addr Inc" field of descriptor 201a triggers the incrementing of the counter value specified by the "Counter Inc" field by the descriptor channel block 108a. The descriptor channel block 108a increments the value of the counter specified by the "Counter Inc" field after the descriptor channel block has transmitted the control information of descriptor 201a to the DMAX associated with the DMAD of the descriptor channel block 108a.

"Link Addr" field helps the electronic circuits within a descriptor channel block of a DMAD maintain a variety of data structure in hardware. "Link Addr" field identifies the DMEM location where the next descriptor that the descriptor channel block must process is stored. Additionally the "Link Addr" field is not programmed by the software, instead the electronic circuits of the descriptor channel block, as described below, will determine the memory location of the next descriptor that should be processed and store the value of that memory location in the "Link Addr" field.

Loop address field of a control descriptor, specifically a loop descriptor, allows the electronic circuits within a descriptor channel block of a DMAD to implement the loop mechanism. In FIG. 2 the "Loop Addr" field of descriptor 203a contains the memory address value of descriptor 201a, thereby causing the descriptor channel block of the DMAD to reprocess descriptor 201a. After reprocessing descriptor 201a, the descriptor channel block of the DMAD will process the descriptor of the memory address stored in the "Link Addr" field of descriptor 201a, which means the descriptor channel block will reprocess descriptor 202a. Thus, the descriptor channel block will continue to reprocess all the descriptors until the loop condition is satisfied. The loop condition in descriptor 203a is specified by "Iteration Count". In FIG. 2 the loop condition is satisfied when the iteration count equals zero.

A descriptor channel block stores the iteration count specified in a loop descriptor in a particular register designated for storing iteration count values. Each time the descriptor channel block processes the loop descriptor, the descriptor channel block reads or retrieves the iteration count value from the particular register and determines whether it is zero or not. If the iteration count value is not zero, then the descriptor channel block processes the loop descriptor, decrements the iteration count value in the particular register by one, and, as described above, reprocesses all the descriptors linked with the loop descriptor. In FIG. 2, descriptor channel block 108a stores the iteration count value of descriptor 203a in a register and every time descriptor channel block 108a processes descriptor 203a, descriptor channel block 108a retrieves the iteration count value stored in the register and determines whether the iteration count value is zero or not. If the iteration count value is not zero, then descriptor channel block 108a processes descriptor 203a, decrements the iteration count value in the register, and begins reprocessing descriptor 201a. Therefore, each descriptor in FIG. 2 will be processed 5 times.

Processing of Descriptors by DMAD

Once the descriptors 201a, 202a, 203a are programmed and stored in DMEM at addresses 0x5000, 0x5010 and 0x5020, respectively, core processor 103a pushes the DMEM addresses of descriptors 201a, 202a, 203a into a FIFO register accessible by DMAD 106a. In an embodiment a core processor also indicates a particular hardware data channel of a descriptor channel block of the DMAD that a descriptor should be pushed onto. The descriptor channel block of the DMAD will either add the descriptors to an existing list maintained by the descriptor channel block or build a new list. In building or adding to the list, the descriptor channel block of the DMAD will write the second memory address pushed on to the FIFO register to the descriptor's link address field of the first descriptor put on the list.

For example, in FIG. 2, memory addresses of descriptors 201a, 202a, 203a are pushed on to a FIFO register accessible by core processor 103a and DMAD 106a. The memory address of descriptor 201a is pushed in first, then the memory address of 202a is pushed in, and then the memory address of 203a is pushed in. As described above, each descriptor channel block of a DMAD maintains two lists per hardware data channel, an active list and a free list. Descriptor channel block 108a determines whether the active list of the hardware data channel onto which the memory addresses of descriptors 201a, 202a, 203a were pushed is empty. In an embodiment, a descriptor channel block may determine whether a list is empty based on a counter associated with the list. Descriptor channel block 108a determines whether the active list is empty based on whether a counter associated with that active list is zero.

The descriptor channel block 108a adds to the active list by writing or copying the memory address of descriptor 202a into the link address field of descriptor 201a and the memory address of descriptor 203a into the link address field of descriptor 202a. If the active list of the hardware data channel controlled by descriptor channel block 108a is not empty, then descriptor channel block 108a writes or copies the memory address of descriptor 201a into the link address field of the last descriptor that was pushed onto that particular hardware data channel, before descriptor 201a. If the active list of the hardware data channel is empty, then descriptor channel block 108a copies the memory address of descriptor 201a from the FIFO register to a register designated to store the next descriptor that will be processed.

Descriptor channel block 108a retrieves the descriptor data of descriptor 201a from the DMEM using the memory address of descriptor 201a. Descriptor channel block 108a determines whether a wait condition needs to be satisfied by checking the WAIT field of the descriptor. In FIG. 2, a WAIT condition is required to be satisfied and is controlled by the value of Event0. Descriptor channel block 108a determines whether the wait condition is satisfied by determining the value of Event0. In an embodiment, a descriptor channel block may determine the value of an event by checking a register comprising values of all events that the descriptor channel block may use or is programmed to use. A WAIT condition is satisfied if the event specified by the WAIT field is at the specified WAIT value. Once, the WAIT condition is satisfied, a descriptor channel block does not have to wait any longer to process the descriptor.

In response to determining that the WAIT condition is satisfied, descriptor channel block 108a continues with the processing of the descriptor and determines the type of the descriptor. In an embodiment, the descriptor channel block determines the type of the descriptor based on an encoded value in the "Desc Type" field. In FIG. 2, descriptor 201a is a read descriptor where the source memory is the DDR memory and the destination memory is the DMEM local to core processor 103a or DMEM unit 102a. Descriptor channel block 108a transmits the control information of descriptor 201a, including the value for the "Src Auto Inc Allow" field, the source counter value, since the "Src Auto Inc Allow" field value is set, and any other information that may be needed to perform any of the operations specified in the descriptor to the read descriptor interface of DMAD 106a. In an embodiment, descriptor channel block 108a may transmit fragments of the control information of a descriptor and any other data needed to perform any of the other operations specified in the descriptor to the read descriptor interface of DMAD 106a. The size of each of the fragments depends on the width of the bus interface connecting descriptor channel block 108a with the read descriptor interface of DMAD 106a. Descriptor channel block 108a also determines whether the source address specified in the descriptor needs to be adjusted or modified based on the "Src Auto Inc Allow" field.

A descriptor channel block may use one or more values of the fields of the descriptor to determine whether or not the source address needs to be automatically adjusted or modified. In FIG. 2 descriptor channel block 108a determines that the source address needs to be automatically adjusted or modified based on the value of the "Src Auto Inc Allow" field. Descriptor channel block 108a also determines whether the value of the counter specified in the "Counter Inc" field should be incremented based on the value of the "Src Addr Inc" field. The counter specified by the "Counter Inc" field of descriptor 201a is the "src" counter. Thus, descriptor channel block 108a also transmits to the read interface of DMAD 106a, the counter value of the "src" counter. Each hardware data channel is associated with a particular counter used in adjusting or modifying a source address, which is stored in a register and a managed by the descriptor channel block controlling the hardware data channel. The "src" counter in example of FIG. 2 is the counter associated with the hardware data channel controlled by descriptor channel block 108a. In FIG. 2, the "src" counter value is zero the first time it is transmitted. Descriptor channel block 108a, after transmitting the value of the "src" counter to the read descriptor interface of DMAD 106a, increments the value of "src" counter by 1.

A descriptor channel block is also associated with a destination counter value. The destination counter value is incremented in a similar manner as the source counter value, except that the value of the "Dest Addr Inc" field determines whether the destination counter will be incremented and the value of the "Dest Auto Inc Allow" field determines whether the destination address specified in the descriptor should be modified by an offset value. The "Counter Inc" field will specify or indicate the destination counter associated with the descriptor channel block.

Processing of Descriptor by DMAX

Descriptor 201a data is transmitted to the arbitration unit 112a and then stored in the FIFO register 112b. FIFO register 112b then transmits the data to read descriptor parser logic block 121b and then into a register within the read descriptor parser logic block 121b. In an embodiment, if descriptor data is transmitted in fragments, then a descriptor parser logic block reassembles the descriptor data.

Processing of Descriptor by DMAC

Descriptor read descriptor parser logic block 121b determines whether the source address specified in the descriptor data should be adjusted based on a value corresponding to an auto increment of source address field. In FIG. 2, "Src Auto Inc Allow" is such a field and based on the value of that field, read descriptor parser logic block 121b determines that the source address should be automatically adjusted or modified. In an embodiment, source address may be automatically adjusted or modified according to the following formula:

New Source Address=source address+source address counter value*rows*column width (size in bytes)

The source address above is the source address transmitted in the descriptor data. The counter value is the value of the counter that was transmitted along with the descriptor data, which in example of FIG. 2 is zero. The rows are the number of rows specified in the descriptor data and column width is the size of the column in bits. Therefore, plugging corresponding values into the above formula results in:

=0x0 0000 0000+0*1000*8

=0x0 0000 0000

The New Source Address above is the same as the source address specified in the descriptor data since the value of the counter that helps determine the offset from the source address is zero. This is an accurate result because descriptor 201a represents the first 1000 rows of the 10,000 rows of data that are required to be processed in FIG. 2, therefore, an offset from the initially specified address is not required. Read descriptor parser logic block 121b transmits the control information of descriptor 201a and any other data required to perform any operations specified in descriptor 201a to an appropriate load engine block of data movement engine 130a based on the direction of the data movement indicated in the descriptor type field of a descriptor. In FIG. 2, the descriptor type field, "Desc Type", indicates that the data movement is from DDR to DMEM, therefore, the appropriate load engine block to which the control information of descriptor 201a and any other data required to perform any operations specified in descriptor 201a is transmitted is a DDR load engine block of data movement engine 130a.

The appropriate load engine block of a data movement engine determines the type of the source memory specified in the descriptor data and generates a read request based on the type of source memory. In FIG. 2, in response to determining that the source memory is DDR memory, the DDR load engine block of data movement engine 130a generates a read request to the system bus interface master block 123. In an embodiment, the amount of data requested in a read request may have a maximum threshold, and the number of read requests generated by an appropriate load engine block of a data movement engine may be based partly on the maximum threshold on the amount data that can be requested within one read request and the amount of data that a descriptor is requesting for in iteration of its processing. For example, if the maximum threshold is 256 bytes, then the appropriate load engine block of data movement engine 130a will generate 32 read requests to satisfy the 8000 bytes of data requested by descriptor 201a.

System bus interface master block 123 accepts the read requests and transmits the read requests to the appropriate memory unit interface that can accept the requests. In response to the requests, data corresponding to the read requests are returned to the system bus interface master block 123. Data corresponding to the read requests is transmitted from the system bus interface master block 123 to the appropriate load engine of the data movement engine that initiated the read requests. The appropriate load engine of the data movement engine transmits the data to an appropriate storage block unit within the data movement engine based on the destination memory unit indicated in the descriptor type field of the descriptor. In the example of FIG. 2, system bus interface master block 123 transmits the data to the DDR load engine of data movement engine 130a, and the DDR load engine transmits the data to the DMEM storage block unit within data movement engine 130a. DMEM storage block unit within data movement engine 130a transmits the data and control information of the descriptor to FIFO register 114b within DMAX 110a along with the destination address specified in descriptor 201a and an identifier associated with core processor 103a. FIFO register 114b identifies, using the core processor identifier included in the control information transmitted to FIFO register 114b from the DMEM storage block unit, DMEM unit 102a as the DMEM unit associated with the core processor identifier, and transmits data from write interface 114a to DMEM unit 102a via DMEM interface block 107a within DMAD 106a to store the data at the destination address specified in the descriptor.

Data Manipulation Operations

In an embodiment, descriptor 201a may indicate that one or more tabular data manipulation operations, such as a gather, a scatter, a gather-scatter, or striding operations, may need to be performed on the tabular data requested from the source memory location.

Gather Operation

A gather operation is a type of filtering operation wherein transfer of a row within a column of tabular data is dependent upon whether the particular row satisfies filtering criteria.

A bit vector or a list of row identifiers are used to evaluate whether the particular row satisfies the filtering criteria. In some embodiments, a high bit within a bit vector indicates that the corresponding row within the column of tabular data should be transferred to the destination memory location. For example, if the bit vector is 1011, then the first, third and fourth rows within the column of tabular data should be transferred to the destination memory location. In some embodiments, a list of row identifiers may point to the exact rows within the column of tabular data that can be transferred to the destination memory location. Therefore, filtering of tabular data from a source memory location is performed prior to storing the tabular data in a destination memory location.

Scatter Operation

A scatter operation allows for tabular data to be stored at non-linear destination addresses. In an embodiment, a scatter operation uses a bit vector or a list of row identifiers and the base destination address to determine the destination address for each row of column of tabular data being transferred to the destination memory location. A gather and a scatter operation, referred herein as a gather-scatter operation, may also be performed in combination.

Gather-Scatter Operation

In a gather-scatter operation, tabular data from the source memory location is filtered while the data is in-flight to the destination address, as described above, and the resulting data is stored within the destination memory in non-linear addresses. In an embodiment, use of a gather and a scatter operation ensures that each row of column of tabular data that satisfied the filtering criteria is stored in the destination memory in a manner such that the memory address offset between one filtered row of column of tabular data to another filtered row of column of tabular data mirrors the source memory address offset.

Stride Operation

A striding operation allows for tabular data to be converted from a column major format in a source memory to a row major format in a destination memory. The striding operation also allows for converting data from row major format in the source memory to column major format in the destination memory. To perform a conversion from column major to row major, a stride is determined based on the number of bytes per row of all interested columns of tabular data. The interested columns of tabular data will belong to a particular data table.

The data movement system, described herein, determines the destination address for each row of a column of tabular data using the base destination address specified in the descriptor and the stride. To perform a conversion from row major format in source memory in order to store it in column major format in destination memory, the data movement system uses the stride to determine all the rows of a column of tabular data. For example, to determine the second row of a column of tabular data, the data movement system uses the stride amount to offset from the address of the first row of column of data stored in the source memory in a row major format. Thus the particular format in which tabular data is stored in a source memory will not provide compatibility issues in processing that data.

Transmission of Tabular Data to Destination Memory

After transmitting data to FIFO register 114b, the DMEM store unit in data movement engine 130a transmits the descriptor return path of descriptor 201a to descriptor return block in DMAC 140, wherein descriptor return path of a descriptor includes a DMAD identifier, a descriptor channel block identifier and a descriptor identifier associated with the descriptor. Descriptor return block in DMAC 140 transmits the descriptor return path of descriptor 201a to a returned descriptor FIFO register within FIFO register 114b. FIFO register 114b transmits the descriptor return path of descriptor 201a to descriptor channel block 108a in DMAD 106a. Descriptor channel block 108a sets the notify event to signal to the core processor 103a that data requested by descriptor 201a is ready to be processed. In FIG. 2, the notify event is identified by the "Notify" field of descriptor 201a, and is Event0.

Descriptor Return Path

Prior to processing a descriptor, a descriptor channel block determines whether there are any free or available descriptor identifiers that can be associated with the descriptor. If the descriptor channel block determines that no descriptor identifiers are available, then the descriptor channel block waits until a descriptor identifier is available. In an embodiment, one or more registers comprise all free descriptor identifiers. Once a descriptor identifier is available, the descriptor channel block begins processing a descriptor and associates the available descriptor identifier with the descriptor. In some embodiments the descriptor identifier may be a 2 bit identifier, therefore, each descriptor channel block within a DMAD may process and support up to four different descriptors at a time. The descriptor identifier associated with the descriptor is included within the control information of that descriptor and transmitted to the DMAC.

Additionally, the descriptor channel block includes its own identifier within the control information transmitted to the DMAC. In some embodiments, the descriptor channel block identifier is a one bit identifier. For example a value of zero in that bit identifies one descriptor channel block of a DMAD and a value of one in that bit identifies the other descriptor channel block of the DMAD. Descriptor channel block also includes a DMAD identifier associated with the DMAD within which the descriptor channel block resides. In some embodiments, the DMAD identifier may be 5 bits.

The descriptor identifier, the descriptor channel block identifier and the DMAD identifier is collectively referred to herein as the descriptor return path. In some embodiments, the identifier associated with the descriptor may be a sequence of bits, and different subsets of the sequence of bits correspond to the descriptor identifier, the descriptor channel block identifier, and the DMAD identifier. For example, the identifier associated with the descriptor may be a sequence of 8 bits, where the five most significant bits correspond to the DMAD identifier, the next bit corresponds to the descriptor channel block identifier and the least significant two bits correspond to the descriptor identifier.

Once the DMAC completes processing all the operations necessary to satisfy the data requests specified in a descriptor, then the DMAC configures a descriptor return path for that descriptor. The descriptor return path of that descriptor includes the DMAD identifier, the descriptor channel block identifier and the descriptor identifier associated with the descriptor and included in the control information of that descriptor. The DMAC transmits the descriptor return to its originating DMAD via the DMAX associated with the originating DMAD. A routing unit within the DMAX associated with the originating DMAD determines the originating DMAD based on the DMAD identifier included in the descriptor return path and transmits the descriptor return path to the descriptor return interface block of the originating DMAD.

The descriptor return interface block of the originating DMAD determines the descriptor channel block that processed that descriptor based on the descriptor channel block identifier and transmits the descriptor return path to the descriptor channel block that processed that descriptor. The descriptor channel block that processed that descriptor determines, based on the descriptor identifier, the DMEM location of that descriptor. In an embodiment, the association between a DMEM location of a descriptor and the descriptor identifier associated with the descriptor is stored in a lookup table by the descriptor channel block that processed the descriptor.

Descriptor channel block 108a determines whether the loop count is zero, and if the loop count is zero, the descriptor channel block 108a determines whether descriptor 201a will be added to the free list of the hardware data channel controlled by descriptor channel block 108a. In an embodiment, the descriptor channel block 108a may determine whether or not a descriptor will be added to the free list based on whether data of the descriptor indicates that the particular descriptor should be added to the free list. For example, there may be a free push field within the data of the descriptor that may have a value of 1 or 0 to indicate that the particular descriptor should be added to the free list. Additionally, if the loop count is zero, then the descriptor channel block 108a also decrements the active count value of that channel by 1. If the loop count is not zero, then descriptor channel block 108a terminates the processing of descriptor 201a for this particular iteration.

Traversing the Hardware Managed List

After descriptor channel block 108a transmits descriptor 201a data to arbitration unit 112a, descriptor channel block 108a determines DMEM unit 102a address of the next descriptor within the active list of the descriptor channel block based on the link address field within the data of descriptor 201a. Descriptor channel block 108a retrieves data of descriptor 202a from DMEM 102a address 0x5010. Descriptor channel block 108a processes descriptor 202a similarly to how descriptor 201a is processed and transmits descriptor 202a data to arbitration unit 112a along with the "src" counter value, as indicated by descriptor 202a. The "src" counter value, when transmitted with the data of 202a, is 1. After descriptor 202a data is transmitted to arbitration unit 112a, descriptor channel block 108a increments "src" counter value by 1. Thus, the "src" counter value is now 2.

Descriptor 202a control information and the "src" counter value transmitted along with descriptor 202a data is stored in FIFO register 112b and then transmitted to read descriptor arbitration unit 121a and stored in read descriptor parser logic block 121b. Read descriptor parser logic block 121b again determines, similar to the way described above, that the source address specified in the descriptor data should be adjusted or auto incremented. Read descriptor parser logic block may adjust or modify the source address according to the same formula described above, which is:

New Source Address=source address+source counter value*rows*column width (size in bytes)

The source address above is the source address transmitted in descriptor 202a data. The counter value is the value of the counter that was transmitted along with descriptor 202a data, which is 1. The rows are the number of rows specified in descriptor 202a data and column width is the size of the column in bytes. Therefore, plugging the corresponding values into the above formula results in:

=0x0 0000 0000+1*1000*8

=0x0 0000 1F40

The New Source Address is now 0x0 0000 1F40, wherein 1F40 is the hexadecimal value equivalent to 8000. This is an accurate result because descriptor 202a represents the second 1000 rows of the 10,000 rows of data that are required to be processed in FIG. 2, therefore, an offset from the initially specified address is required. Read descriptor parser logic block 121b transmits the descriptor data to the appropriate load engine block of data movement engine 130a. The appropriate load engine block of data movement engine 130a processes descriptor 202a data similar to the processing of descriptor 201a data. Data retrieved for descriptor 202a is stored in DMEM 102a at the destination memory address specified in descriptor 202a.

DMEM 102a address of descriptor 202a is transmitted from descriptor return block of DMAC 140 to descriptor channel block 108a of DMAD 106a similar to the way DMEM 102a address of descriptor 201a was transmitted above. Descriptor channel block 108a sets notify event to signal to the core processor 103a that data requested by descriptor 202a is ready to be processed. In FIG. 2, the notify event identified by the "Notify" field of descriptor 202a is Event1. Descriptor channel block 108a again determines whether the loop count is zero and if it is zero, then descriptor channel block 108a completes processing of descriptor similar to the way described above for descriptor 201a. If the loop count is not zero, then descriptor channel block 108a terminates the processing of descriptor 202a for this particular iteration.

Hardware Implemented Looping Mechanism

After descriptor channel block 108a transmits descriptor 202a data to arbitration unit 112a, descriptor channel block 108a determines DMEM 102a address of the next descriptor within the active list of the descriptor channel block based on the link address field of descriptor 202a. Descriptor channel block 108a retrieves data of descriptor 203a from DMEM 102a address 0x5020. Descriptor channel block 108a determines that descriptor 203a is a program or control type descriptor and in particular a loop type descriptor. Descriptor channel block 108a determines whether the loop count or iteration count is zero and if it is not zero, then descriptor channel block 108a decrements the loop count value by 1. As described above, the loop or iteration count is stored in a particular register designated for storing loop count values and the descriptor channel block retrieves the loop count value from the particular register and determines whether the loop count value is zero or not. If the loop count is not zero, then the descriptor channel block updates the loop count by decrementing the loop count value by 1 and stores the updated loop count value in the particular register. In FIG. 2, the iteration count value starts at 4, therefore, the first time descriptor 203a is processed, the loop or iteration count is 4 and after it is decremented by descriptor channel block 108a, the loop or iteration count will be 3.

In response to determining that the loop or iteration count is not zero, descriptor channel block 108a determines which descriptor it should loop back to and reprocess. Descriptor channel block 108a determines which descriptor it should loop back to based on descriptor 203a specifying a loop back address that identifies the DMEM address of the descriptor that should be processed again. In FIG. 2, the loop back address is specified in the "Loop Addr" field of descriptor 203a and DMEM 102a address of 0x5000 is the address of descriptor 201a within the DMEM 102a.

Descriptor channel block 108a retrieves descriptor 201a data from DMEM 102a. Descriptor channel block 108a determines whether the wait condition of descriptor 201a is satisfied based on value of event Event0. In FIG. 2, the wait condition of descriptor 201a is satisfied if Event0 value is 0. As described above, descriptor channel block 108a previously set the value of Event0 to 1 in order to indicate to core processor 103a that data is available for processing at the destination address specified by descriptor 201a. Therefore, if core processor 103a did not complete its processing of the data at the destination address specified by descriptor 201a, then the core processor will not clear Event0 to 0, hence descriptor channel block 108a must wait until the Event0 value is cleared to 0, i.e. set to 0.

If Event0 value is cleared to 0, then descriptor channel block 108a processes descriptor 201a similar to the way descriptor 201a was processed in the previous iteration, described above. Descriptor channel block 108a continues to traverse the active list of the hardware data channel and based on the link address data of descriptor 201a retrieves descriptor 202a data. Descriptor channel block 108a processes descriptor 202a similar to the way it was processed in the previous iteration. Descriptor channel block 108a continues to traverse the active list of the hardware data channel and based on the link address data of descriptor 202a retrieves data of descriptor 203a.

Descriptor channel block 108a again determines whether the loop count is 0. Loop count value is 3, therefore, descriptor channel block 108a decrements the loop count value by 1 and again loops back to descriptor 201a and processes descriptor 201a again. Descriptor channel block 108a continues to loop through the descriptors until the loop count value is 0. When the loop count value is 0, descriptor channel block 108a determines whether source or destination counters of the descriptor channel block 108a should be reset. In FIG. 2, descriptor 203a specifies, with "Src Count Reset" and "Dest Count Reset", fields that source and destination counters of hardware data channel must be reset.

Descriptor channel block 108a notifies core processor 103a that the loop has terminated or finished by setting the value of Event30 to 1 since Event30 is specified in descriptor 203a as the event that the core processor is configured to receive a notification from for descriptor 203a. Descriptor channel block 108a also decrements the active list count of the hardware data channel by 1. Processing of descriptor 203a is now complete and consequently processing of descriptors 201a and 202a. Thus, 10,000 rows of data from a source memory location have been processed by the data movement system.

Moving a Data Table Using Descriptors

Figure 3:
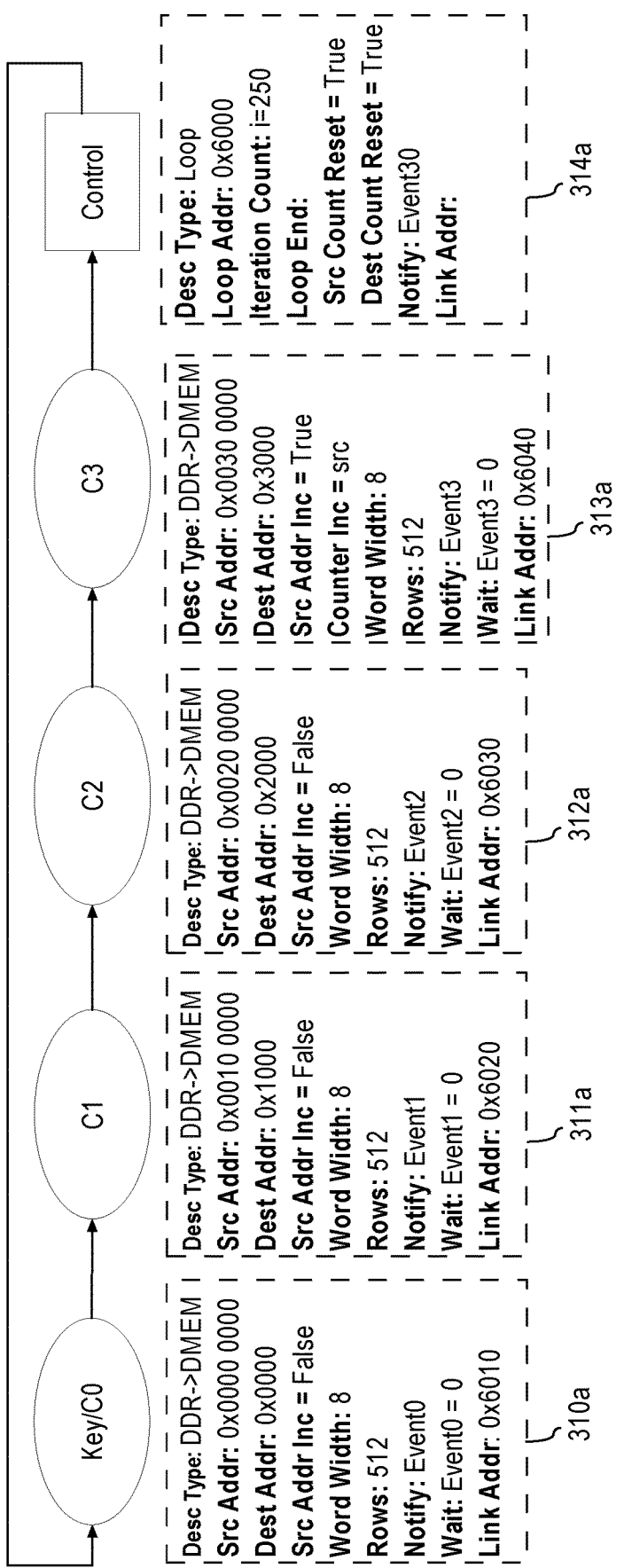
FIG. 3 illustrates an example of descriptors for moving data stored in tabular format.

FIG. 3 illustrates an example of moving an entire data table, comprising four columns, from a source memory to a local DMEM using descriptors. FIG. 3 comprises four data descriptors, 310a, 311a, 312a, 313a and one control descriptor 314a. Each descriptor represents a column of data of the data table stored in the source memory. Source memory in FIG. 3 is a DDR memory external to the data movement system. Destination memory in FIG. 3 is a DMEM, local to the core processor that programmed descriptors 310a, 311a, 312a, 313a. For the purpose of illustrating a clear example, FIG. 3 will be described using the hardware components and processes described in FIG. 1 and FIG. 2. For the purpose of illustrating a clear example, descriptors in FIG. 3 are also programmed by core processor 103a.

Descriptor 310a specifies the starting address of the first column of the data table in the source memory at the "Src Addr" field of descriptor 310a. Similarly, descriptors 311a, 312a, 313a, specify starting addresses of the second, third and fourth columns of the data table in the source memory as their respective source addresses. Within the "Dest Addr" field, each of the descriptors 310a, 311a, 312a, 313a specify a different destination address within DMEM 102a, the DMEM local to core processor 103a. Descriptor 314a is a loop descriptor which indicates that the descriptor channel block that processes these descriptors should loop back to descriptor 310a, the descriptor that is stored at the DMEM 102a address specified in descriptor 314a.

One of the descriptor channel blocks of DMAD 106a will add descriptors 310a, 311a, 312a, 313a, 314a to the active list of the hardware data channel controlled by the descriptor channel block similar to the way descriptor channel block in FIG. 2 added descriptors to the active list. The descriptor channel block will begin processing descriptors of FIG. 3 with descriptor 310a. Processing of descriptor 310a is similar to the way descriptor processing has been described in FIG. 2 and FIG. 1.

However, unlike FIG. 2, the source address counter of the descriptor channel block will not be incremented after descriptor 310a data is transmitted to the arbitration unit 112a because descriptor 310a does not specify that the source address counter should be incremented. This is accurate for FIG. 3 because source addresses of descriptors 311a, 312a, and 313a are different for each since each descriptor is processing a different column of data of the data table, each of the descriptors 311a, 312a, and 313a, in the first iteration of the loop, should process their respective column of data from the source address specified in the descriptor, without any offset from the source address. Similarly, descriptor 311a, 312a also do not specify that source address should be incremented in order to ensure that the descriptor following them begins processing their respective columns of data from the correct memory address.

Descriptor 313a data specifies that the source address counter should be incremented. Thus, the source counter of descriptor channel block 108a is incremented after control information of descriptor 313a is transmitted to arbitration unit 112a. Incrementing source address counter after the last bytes of the control information of descriptor 313a is transmitted ensures that the next time descriptors 310a, 311a, 312a, 313a are processed the source address specified in 310a, 311a, 312a, 313a are adjusted, modified or offset accurately. The remaining aspects of processing and returning descriptors 310a, 311a, 312a, 313a, 314a are similar to the way it is described in FIG. 1 and FIG. 2.

Thus, data movement system may copy an entire data table from a source memory and store the data table in a destination memory using descriptors.

Performing Data Manipulation Operations

Approaches for performing tabular data manipulation operations while moving data from a source memory location to a destination memory location are initially illustrated using a gather operation. As described earlier, a gather operation is a type of filtering operation wherein transfer of a row within a column of tabular data is dependent upon whether the particular row satisfies a filtering criteria and a scatter operation allows for tabular data to be stored at non-linear destination addresses. Other types of tabular data manipulations operations will be described later.

Figure 4:
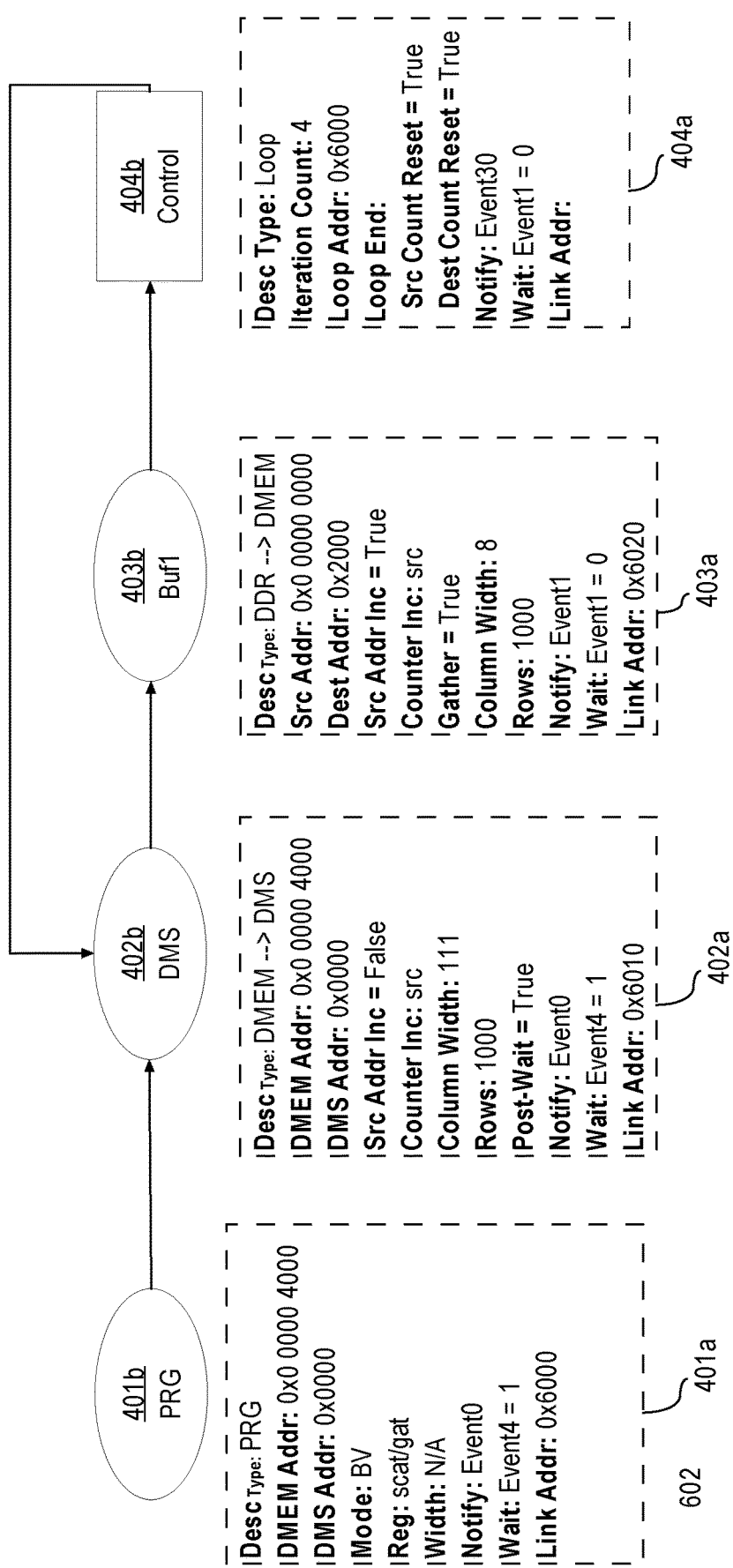
FIG. 4 illustrates an example of descriptors for performing data manipulation operations on one or more columns of tabular data.

FIG. 4 illustrates example descriptors used for performing a gather operation. These descriptors include a data descriptor that specifies to perform a gather operation for a column. A data descriptor may also specify a scatter operation. A gather or scatter operation can be performed using several filter modes for filtering rows, one mode using a list of row identifiers (RID) and one using a BV.

The filter mode is specified by a value in a "scat/gat" register of a DMAD. A program descriptor is used to configure the value of a "scat/gat register". The value of the scat/gat register specifies not only whether the filter mode is RID or BV, but also the storage address of a RID or BV within the DMS memory. A RID or BV that is used to perform a gather operation is copied from DMEM to DMS memory, or from main memory to DMS memory, using a data descriptor.

Referring to FIG. 4, it depicts four descriptors, program descriptor 401a, data descriptor 402a and data descriptor 403a, and loop descriptor 404a. For the purposes of illustration, FIG. 4 will be described using the hardware components and processes described in FIG. 1, FIG. 2, and FIG. 3; descriptors in FIG. 4 are also programmed by core processor 103a. The descriptors are used to perform a gather operation using a BV.

In FIG. 4, core processor 103a configures program descriptor 401a, which is used to configure a scat/gat register. The value of the scat/gat register specifies various aspects of performing a gather operation. Descriptor 401a indicates that it is a program descriptor by specifying in the descriptor type field a value that a DMAD decodes to be corresponding to a program descriptor. Descriptor 401a specifies to configure the scat/gat register value by specifying the scat/gat register in the "Register" field. The value of the scat/gat register specifies whether RID or BV mode is being used for filtering, and if RID mode is specified, what the width of a RID is.

Accordingly, Descriptor 401a specifies whether RID or BV mode is being used for filtering by specifying a particular value in the "Mode" field. In descriptor 401a, that value specifies BV mode. If the mode had been RID, then descriptor 401a should have specified the width of a RID. According to an embodiment, the width of a RID may be 1, 2, 4, or 8 bytes.

Descriptor 401a also specifies the DMS memory address of where the BV should reside. The BV may be initially formed and/or stored by core processor 103a in its DMEM unit 102a. A separate descriptor, descriptor 402a, specifies to move a RID or BV to this DMS memory address.

Descriptor 402a is the data descriptor in FIG. 4 that specifies to move the BV from DMEM to DMS memory. Descriptor 402a specifies that the BV is stored at the DMEM location specified by the "DMEM Addr" field, i.e. the source memory location. Descriptor 402a also specifies, using the "DMS Addr" field, the destination address of where that BV is to be stored. The value in the "DMS Addr" field specifies a memory location within DMS memory 150 to store the BV. Moving or copying and storing the BV (or RID) to a DMS memory reduces latency in accessing the BV (or RID) by the data movement engine while performing the gather operation. In an embodiment, Descriptor 402a can specify to move a BV (or RID) from main memory or a DDR memory unit to DMS memory.

Furthermore, descriptor 402a also indicates the length of the BV that is to be stored in the destination memory specified in program descriptor 401a and 402a. In an embodiment, the length of the BV that is to be stored is based on the number of rows specified in the particular descriptor that will be processed to move the BV to DMS memory from DMEM. Descriptor 402a also specifies in the "Rows" field the number of bits that particular bit vector comprises.

In FIG. 4, descriptor 403a is a data descriptor that specifies a gather operation to be performed on a column of tabular data. Descriptor 403a specifies within the "Gather" field that a gather operation should be performed. In an embodiment, the value within the "Gather" field may be an encoded value such as a bit or binary number that indicates to a descriptor channel block within a DMAD that a gather operation is being requested to be performed on the column of tabular data. The other fields of descriptor 403a are similar to the fields of the descriptors described in FIG. 2 and FIG. 3, and similar to descriptors processed by the DMS shown in FIG. 1.

Descriptor 404a is a loop descriptor. It is configured and processed similarly as described for loop descriptor 314a.

Processing Gather Operation

In FIG. 4, elements 401b, 402b, 403b and 404b each correspond to operations performed for descriptors 401a, 402a, 403a, and 404a, respectively. The purpose of these elements is to depict the order of operations performed for descriptors 401a, 402a, 403a, and 404a.

Core processor 103a configures descriptors 401a, 402a, 403a, and 404a, and transmits the respective memory locations within DMEM unit 102a to one of descriptor channel blocks in DMAD 106a. For example, core processor 103a may transmit an identifier associated with descriptor channel block 108a along with the memory location of descriptor 401a to a FIFO interface within DMAD 106a. DMAD 106a, based on the identifier received, adds descriptor 401a to the active list of descriptor channel block 108a. The other descriptors 402a, 403a, and 404a are processed similarly. Retrieval of descriptors 401a, 402a, 403a, and 404a are performed in the same manner as described in relationship to FIG. 1, FIG. 2 and FIG. 3.

In FIG. 4, descriptor channel block 108a decodes descriptor 401a and identifies descriptor 401a as a program descriptor based on the descriptor type field of descriptor 401a. Since descriptor 401a identifies the register to configure as the scat/gat register, the descriptor channel block 108a configures scat/register of DMAD 106a to a value that specifies that the filtering mode is BV, and the address in DMS memory 150 of where the BV will be stored.

In FIG. 4, descriptor channel block 108a decodes descriptor 402a and identifies descriptor 402a as a data descriptor based on the descriptor type field of descriptor 402a. As described above, the descriptor type field of a data descriptor also indicates the direction of data movement, thus identifying the source memory location, from where data is to be moved or copied from, and a destination memory location, to where the data is to be stored. Descriptor type field of descriptor 402a indicates that the direction of data movement is from DMEM to a memory unit in DMS memory, therefore, the memory location specified in the "DMEM addr" field is the source memory location of data within the DMEM unit 102a and the memory location specified in the "DMS addr" field is the destination memory location within DMS memory unit used for storing the BV.

Routing unit 114a transmits the read request, based on the control information of descriptor 402a, to the DMEM interface block 107a. DMEM interface block 107a retrieves the BV from DMEM unit 102a, based on the memory location specified in the "DMEM Addr" field of descriptor 402a. The control information received at DMEM interface block 107a includes the memory location specified in the "DMEM Addr" field of descriptor 402a. DMEM interface block 107a generates a read response comprising the BV from DMEM unit 102a and control information of descriptor 402a. DMEM interface block 107a transmits the read response to arbitration unit 113a. Arbitration unit 113a, based on the control information of descriptor 402a, transmits the read response to data movement engine 130a.

Data movement engine 130a stores the BV at the memory location specified in the "DMS Addr" field of descriptor 402a in the memory unit of the DMS used for storing row identifiers or BVs.

Processing of descriptors that specify data manipulation operations that use the BV and that follows a descriptor that stores the BV in a memory unit in DMS may be temporarily suspended until all of the required BV is successfully stored in the memory unit in the DMS, thereby preventing generation of read or write requests using an incomplete BV for the descriptors that specify the data manipulation operations.

The descriptor channel block may temporarily suspend processing of descriptors that follow the current descriptor that is being processed, based on the type of wait event and wait conditions specified in the current descriptor. One type of wait event, referred to herein as a "pre-wait" event, is a wait event that indicates to the descriptor channel block that the processing of the descriptor that specified that event type should not begin until the wait condition, also specified in that descriptor, is satisfied. An example of this type of wait event is described in FIG. 2 and FIG. 3 above. Another type of wait event, referred to herein as "post-wait" event, is a wait event that indicates to the descriptor channel block that the descriptor specifying the post-wait event type can be processed, however that the descriptor channel block cannot begin processing the next descriptor in the active list of that descriptor channel block until the wait condition specified in the descriptor with the post-wait is satisfied and that the operation the descriptor is performing has completed.

FIG. 4 illustrates the use of the post-wait event to temporarily suspend processing of the other descriptors in the active list of the descriptor channel block. In FIG. 4, descriptor 402a specifies that the event type is a post-wait event, therefore descriptor channel block 108a, the descriptor channel block processing descriptor 402a, temporarily suspends processing of the next descriptor until the post-wait condition specified in descriptor 402a is satisfied. As described above, a post-wait condition is satisfied if the event specified in the "WAIT" field of the descriptor is at the value specified in the "WAIT" field of the descriptor and the operation specified by the descriptor has been completed. In FIG. 4, the post-wait condition of descriptor 402a is satisfied when the value of Event4 is set to 1. Therefore, descriptor channel block 108a, the descriptor channel block processing descriptor 402a, does not begin processing of the next descriptor on the active list of descriptor channel block 108a, descriptor 403a, until the value of Event4 is set to 1. Thus, all descriptors after descriptor 402a in the active list of descriptor channel block 108a are temporarily suspended until the wait condition of the post-wait event of descriptor 402a is satisfied and the operation specified by descriptor 402a, movement of the BV from DMEM to DMS memory, has completed.

Once the wait condition of descriptor 402a is satisfied, descriptor channel block 108a traverses its active list as described in relationship with FIG. 2 and FIG. 3, and begins processing descriptor 403a. Descriptor channel block 108a determines, based on the descriptor type field, that descriptor 403a is a data descriptor and that the direction of data movement is from an external memory into DMEM unit 102a. Descriptor channel block 108a also determines that a gather operation should be performed on the tabular data being stored into the DMEM unit 102a.

As described above, the data movement system performs data manipulation operations, such as a gather operation on the tabular data, prior to that tabular data being stored in the destination memory unit. Therefore, the data movement engines in DMAC 140 will perform the gather operation requested by descriptor 403a on the tabular data retrieved from the source memory location prior to any of the tabular data being stored in the destination memory unit of the destination memory location specified in descriptor 403a.

Descriptor channel block 108a transmits the control information of descriptor 403a including the gather operation specified in descriptor 403a to arbitration unit 112a. Arbitration unit 112a transmits control information of the scat/gat register of DMAD 106a, the gather operation specified in descriptor 403a, and an identifier associated with DMAX 110a to read descriptor parser block 121b via read descriptor arbitration unit 121a.

As described above, one or more data movement engines may be associated with one or more DMAX units such that the read descriptor or write descriptor parsers of a DMAC will transmit the descriptor control information including any data manipulation operations specified in the descriptor received from the one or more DMAX units to the associated data movement engines. In FIG. 1, data movement engine 130a is associated with DMAX 110a for most data movement descriptors, therefore, read descriptor parser 121b or write descriptor parser 120b transmit the descriptor control information including any data manipulation operations specified in the descriptor received from DMAX 110a to data movement engine 130a.

Read descriptor parser 121b, based on the received DMAX identifier, transmits control information from scat/gat register of DMAD 106a, the gather operation specified in descriptor 403a, and an identifier associated with DMAX 110a to data movement engine 130a since data movement engine 130a is associated with DMAX 110a.

A data movement engine determines that data manipulation operations are to be performed on the tabular data that is being moved or copied from the source memory location based on the descriptor information received from either a read descriptor parser or a write descriptor parser. In FIG. 1, data movement engine 130a, retrieves the BV stored in the memory unit of DMS, designated for storing the BV, at the memory location specified in the "DMS Addr" in control information from the scat/gat register as detailed in the sequence shown in FIG. 4. This control information also informs data movement engine 130a that the filtering mode is BV.

Data movement engine 130a parses the retrieved BV in order to determine whether a read request to the source memory should be generated. As described above, each bit within a bit vector corresponds to a row in the column of tabular data stored at the source memory location in the source memory unit. The value of each bit identifies whether the corresponding row in the column of tabular data may be stored in the destination memory unit or whether it may be filtered out, thus not stored in the destination memory unit. In an embodiment, a row in a column of tabular data will be stored in a destination memory unit if the value of the corresponding bit in the BV is a 1 and a row in a column of tabular data will be filtered out if the value of the corresponding bit in the BV is a 0.

In an embodiment, a data movement engine parses the BV to determine whether values of a sufficient number of consecutive bits indicate that their corresponding rows will be filtered out such that a read or write request for their corresponding rows is not generated. The data movement engine checks whether the total cumulative size of data from the corresponding rows exceeds a threshold size of data in determining whether a read or write request for the corresponding rows should be generated. In determining the total cumulative size of data from the corresponding rows, a data movement engine may calculate the cumulative size using the column width of the column of tabular data, specified in the descriptor and transmitted to the data movement engine, and the number of bits that indicate that their corresponding rows will be filtered out. By using a threshold size of data in part to determine whether a read or write request should be issued allows the data movement system to provide a flexible process of determining read or write requests for a particular set of rows within a column of tabular data.

The threshold size of data may depend in part on the amount of data per read or write request that can be transmitted from a source memory location. For example, if the amount of data that can be transmitted per read or write request is 256 bytes, then the threshold amount of data may be set to 256 bytes and a data movement engine may not generate a read request if a consecutive number of bits that indicate that their corresponding rows should be filtered out multiplied by the column width equal or exceed 256 bytes. The data movement engine may skip the generation of a read request for the rows corresponding to that set of consecutive number of bits and generate read or write requests for the rows corresponding to the remaining number of bits in the bit vector. Consequently, the number of read or write requests generated by a data movement engine when a gather operation is specified depends on the consecutive number of bits that indicate that their corresponding rows will be filtered out and not simply on the number of rows specified in a descriptor.

In FIG. 4, descriptor 403a specifies the column width is 8 bytes, and if the threshold amount of data is 256 bytes, then data movement engine 130a may determine that a read request will not be generated if the values of 32 consecutive bits in the retrieved BV indicate that their corresponding rows in the column of tabular data should be filtered out. Thus, data movement engine 130a generates read requests based on the values of the bits in the BV data. Data movement engine 130a transmits the read requests and control information of descriptor 403a to system bus interface master block 123. System bus interface master block 123 stores the control information of descriptor 403a in a register within system bus interface master block 123.

System bus interface master block 123 transmits the received read requests to the source memory unit. For each read request, system bus interface master block 123 receives data from the source memory unit. System bus interface master block 123 transmits the column of tabular data from the source memory unit and the control information of descriptor 403a to data movement engine 130a. Data movement engine 130a, based at least in part on the received gather operation and/or control information of descriptor 403a from system bus interface master block 123, transmits the column of tabular data to a gather operation engine.

The gather operation engine, based on the BV, determines whether the corresponding row within the received column of tabular data should be stored in the destination memory unit. For each bit in the BV, the gather operation engine, based on the value of the bit, determines whether the corresponding row should be stored in the destination memory unit. The gather operation engine identifies the corresponding row of a bit within the column of tabular data based on the following:

Gather address=Descriptor source base address+(column width*bit number)

The gather address given above represents the address of the row corresponding to the bit number. The descriptor source base address is the source memory location specified in descriptor 403a. The column width is the size of the column in bytes and bit number represents a bit within the BV and bit number starts from zero. For example, if the BV is comprised of four bits, 1011, then bit number zero is the first bit from the right and has value of one. Bit number one is the second bit from the right and has a value of one. Bit number two is the third bit from the right and has a value of zero. Bit number three is the fourth bit from the right and has a value of 1.

In an embodiment, the gather operation engine stores data gathered from source addresses where the values of the bits of bit numbers are 1. The gather operation engine transmits the data of the rows with corresponding bit values of 1 to the DMEM store engine. The gathered data is accumulated and stored in a contiguous memory range in the destination memory. The data of the rows is transmitted to DMEM unit 102a as described in relationship to FIG. 1, FIG. 2, and FIG. 3.

Scatter Operation

Similar to the gather operation, a descriptor may specify a scatter operation. Data received from a source memory location is transmitted to the scatter operation engine. The BV is also transmitted to the scatter operation engine. The scatter operation engine determines the destination address for each row of column of tabular data according to the following:

Scatter address=Descriptor destination base address+
(column width*bit number)

The scatter address above represents the destination address of where each qualifying row of the column of tabular data will be stored. The descriptor destination base address is the address specified in the descriptor. The column width is the size of the column in bytes and bit number represents a bit within the BV where the bit number starts from zero.

A descriptor may specify, both, a gather and a scatter operation to indicate that a gather operation should be performed on the data from the source memory location and that a scatter operation should be performed on the data upon which a gather operation is performed. The functionality of the gather and the scatter operations when, both, a gather and a scatter operation are specified is similar to the way described above for the gather operation and for the scatter operation.

Striding Operation

A group of descriptors (one per column) may specify that a striding operation should be performed on a group of columns of tabular data from their source memory location to their destination memory location. The striding operation as described above transforms tabular data stored in column major format at the source memory location to row major format at the destination memory location or tabular data stored in row major format at the source memory location to column major format at the destination memory location.

A core processor may determine a stride amount to help transform from a column major format to a row major format or vice versa. The stride amount is the number of bytes per row across all columns of tabular data that are of interest. For example, if two columns of tabular data are to be moved or copied from an external memory unit and stored into a DMEM unit in row major format, then the stride amount is the sum of the column widths of both columns of tabular data.

Data from the source memory location is transmitted to the stride operation engine and the stride operation engine transforms tabular data stored in a column major format to a row major format according to the following:

destination address=destination base address+
($dst\_count$*stride)

The destination address above represents the destination address in DMEM and the destination base address represents the destination address specified in the descriptor. Dst_count represents the row number of the column element being moved and stride represents the stride amount in bytes. Thus each row of tabular data from the source memory stored in column major format will be stored at the destination memory in row major format.

The stride operation engine may transform tabular data stored in a row major format to a column major format according to the following:

source address=source base address+
($src\_count$*stride)

The source address above represents the source address in DMEM, and the source base address represents the source address specified in the descriptor. Src_count represents the row number of the column element being moved and stride represents the stride amount in bytes. Thus each row of tabular data stored in row major format at a source memory location will be stored at the destination memory in column major format.

Aligned Run Length Encoding (ARLE) Operation

The data movement system described herein allows for encoded or compressed data from a source memory location, such as main memory or a DDR memory unit, to be decompressed prior to storing the data in the destination memory unit, such as a DMEM unit, and for un-encoded or decompressed data from a source memory location, such as a DMEM unit, to be compressed prior to storing the data in main memory or a DDR memory unit.

Compression and decompression of tabular data is performed on the fly, based on values specified in certain fields of a descriptor. Compression and decompression of a column of tabular data are performed based on a corresponding run and data array. A run comprises one or more elements, where each element specifies how many times a corresponding data element of a data array is repeated. Compression takes an uncompressed column of data and generates a data array and a corresponding run array; decompression takes a run array and a data array and generates an uncompressed column of data. When decompressing ARLE compressed data, the DMS logic reads the data and run arrays from main memory and stores them in internal DMS memory buffers. Buffering run and data arrays stored in main memory in DMS memory avoids multiple accesses to the same array in main memory, thus reducing the overall power consumed by the DMS, and improving performance of decompressing tabular data within the DMS. Likewise, when performing ARLE compression, the DMS creates the run and data arrays in local DMS memory and moves the arrays to main memory when the local memory fills. Using the local DMS memory for compression has benefits similar to those described for using local DMS memory for decompression.

The total size of a run and data array depends in part on the number of rows being moved or copied from the source memory location. The size of the arrays also depends in part on the width of the column of tabular data that is being moved or copied from the source memory location and the average compression ratio of the column of tabular data. The size of the run array depends on the maximum run value that can be stored. In one embodiment, a run element is one byte wide. For example, if the width of the column of tabular data is 2 bytes, the number of rows being moved of that column tabular data is 256, and the average compression ratio is 1:4, then the total size of the run array is 256/4 or 64 bytes and the total size of the data array is (256/4)*(width of the column of tabular data) or (256/4)*2, or 128 bytes.

When performing decompression, the run and data arrays are moved or copied from a source memory location to the local DMS memory unit coupled with the ARLE compression/decompression block using descriptors.

A core processor configures an auxiliary type descriptor to provide the address of the run array to the data movement system. The descriptor type field of the auxiliary descriptor comprises a value that indicates that the descriptor is an auxiliary type descriptor. In an embodiment, that value is a sequence of binary numbers that indicate to the descriptor channel block that the descriptor is an auxiliary type descriptor. The descriptor channel block decodes the auxiliary descriptor similarly to the methods described above. The descriptor channel block determines the control information for the auxiliary descriptor similarly to the methods described above.

The run address provided in the auxiliary descriptor is the start address of the run. In an embodiment, the auxiliary descriptor comprises a "Run Address" field and the run address is provided as the value of the "Run Address" field.

In an embodiment, the width of the run array is limited to one byte. The descriptor channel block includes the descriptor type of the auxiliary descriptor and the run address within the control information determined by the descriptor channel block. The descriptor channel block transmits the control information of the auxiliary descriptor to a data movement engine similar to the methods described above.

Since the descriptor is an auxiliary descriptor, the data movement system does not move any data from a source memory location to a destination memory location. Instead, the data movement system stores the values provided in the auxiliary descriptor to use in processing the data descriptor that follows the auxiliary descriptor. Thus, the read parser, based on the control information and in particular the descriptor type, determines that the descriptor is an auxiliary descriptor and stores the run address provided in the control information in a register and does no further processing until a data descriptor is received.

After configuring the auxiliary type descriptor, the very next descriptor configured by the core processor is a data descriptor. The information provided in the auxiliary type descriptor preceding the data descriptor will be used in processing the data descriptor. The data descriptor provides the starting address of the aligned run length encoded tabular data in a source memory unit, such as the main memory or another memory unit. This is what was referred to as the data array in the preceding paragraphs. The "Rows" field of this data descriptor comprises information about the number of rows that will result after the aligned run length encoded tabular data is decoded. The "Width" field of the data descriptor comprises a value indicating the column width of the data array available at the starting address of the data array, which is provided in the data descriptor.

The data descriptor following the auxiliary descriptor initiates the movement of the run array needed in run length aligned decoding of the tabular data. The data movement engine generates a read request for the run array where the source address included in the read request is the run address from the auxiliary descriptor that was stored in the read parser and then moved to a register accessible by the data movement engine. The data movement engine transmits the read request to the system bus interface master block. The data movement engine also generates a read request for the data array and transmits the read request to the system bus interface master block.

The system bus interface master block retrieves the run and data arrays from their respective source memory locations similar to the methods described above. The system bus interface master block transmits the arrays to the data movement engine. The data movement engine decodes the data array using the run array. The decoded run length aligned encoded data is stored in the destination memory location specified in the data descriptor similar to the methods described above. The destination memory location in one embodiment can either be in DMEM associated with the originating descriptor channel block of the data descriptor (such as 102a in FIG. 1) or in DMS memory to be used for subsequent DMS processing (150 in FIG. 1).

Data Manipulation Operation Blocks

Figure 5:
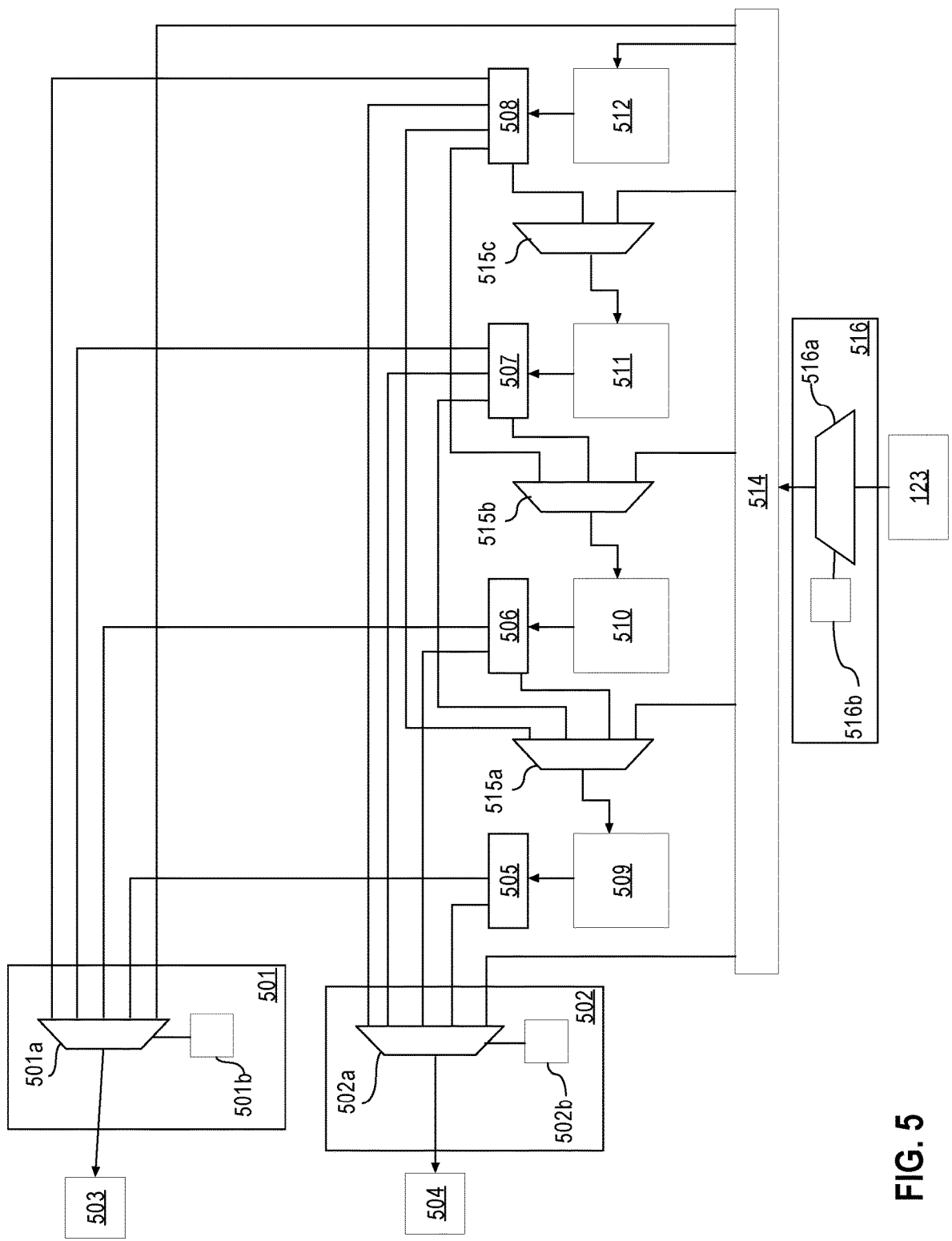
FIG. 5 illustrates an example arrangement of data manipulation operation blocks

FIG. 5 illustrates an example arrangement of data manipulation operation engines. For the purposes of illustration, a clear example of data manipulation operations are shown using elements of FIG. 1. FIG. 5 depicts a plurality of data manipulation operation blocks within each of data movement engines 130a, 130b, 130c, and 130d.

FIG. 5 comprises stride operation block 509, scatter operation block 510, gather operation block 511 and ARLE decompression block 512. As described above, system bus interface master block 123 forwards data requests to the source memory location and also receives data, including tabular data, from the source memory location. System bus interface master block transmits data received, in response to the read requests, from the source memory location and control information of the descriptor that requested the data to arbitration unit 516. Arbitration unit 516 comprises multiplexer 516a and arbiter 516b. Multiplexer unit 516a transmits data received from the source memory location and control information of a descriptor to routing unit 514.

Routing unit 514, based on the control information received from multiplexer 516a, transmits the data received from the multiplexer 516a to either one of the data manipulation operation blocks 509, 510, 511, 512 or to routing unit 502, comprising multiplexer 502a and routing controller 502b. For example, if control information received from multiplexer 516a does not indicate that any data manipulation operations are to be performed, then the tabular data and the control information received from multiplexer 516a is transmitted to multiplexer 502a. Therefore, the data movement system provides flexibility in skipping one or more data manipulation operation blocks rather than wasting clock cycles or data manipulation operation block resources when performance of data manipulation operations is not required.

Similarly, if control information received from multiplexer 516a indicates one or more data manipulation operations, then the tabular data and the control information received from multiplexer 516a is transmitted to the appropriate data manipulation operation block. Routing unit 514 may be configured with a particular order in which data manipulation operations are to be performed on a set of tabular data when the control information indicates that more than one data manipulation operation is to be performed on the data received from multiplexer 516a.

An example order in which data manipulation operations are to be performed on a set of tabular data is, first, decompression of the tabular data by an ARLE operation block, if the control information associated with that tabular data indicates that such an operation is to be performed. Then, a gather operation is performed on the decompressed tabular data, if the control information indicates that a gather operation should be performed. Following the gather operation, a scatter operation is performed on the tabular data remaining after the gather operation, if the control information indicates that a scatter operation is to be performed. Finally, a stride operation is performed on the tabular data upon which the scatter operation is performed, if the control information indicates that a stride operation should be performed. This example order of data manipulation operations is illustrated in FIG. 5.

In FIG. 5, routing unit 514 is configured to route tabular data received from multiplexer 516a to ARLE decompression block 512 first, if control information received from multiplexer 516a indicated that the tabular data should be decompressed. ARLE decompression block 512 transmits the decompressed tabular data and the associated control information to routing unit 508. Routing unit 508, based on the control information, determines whether additional data manipulation operations are requested or required and transmits the data accordingly. Suppose the control information indicates that a gather operation should also be performed, then routing unit 508 transmits the tabular data resulting from the ARLE decompression and the control information to multiplexer 515c, which transmits it to gather operation block 511.

Gather operation block 511 performs the gather operation as described above and transmits the resulting tabular data and the control information to routing unit 507. Routing unit 507 determines if the control information indicates performance of any other data manipulation operations on the tabular data. In an embodiment, routing unit 507 only checks for whether the control information indicates that either a scatter or a stride operation is to be performed, since the next operations in the order are a scatter operation and/or a stride operation, but not an ARLE operation. Additionally, routing unit 507 can transmit to either the scatter operation block 510 or the stride operation block 509, but cannot transmit to ARLE decompression block 512.

Suppose that the control information indicated that a stride operation is to be performed, then routing unit 507 transmits the resulting tabular data and the control information to multiplexer 515a. Multiplexer 515a transmits the tabular data and the control information to stride operation block 509. Thus, scatter operation block 510 is completely skipped over, saving the resources of scatter operation block 510. Stride operation block 509 transmits the resulting tabular data to routing unit 505. Routing unit 505, based on the destination memory location indicated in the control information, transmits the resulting tabular data and the control information to either multiplexer 501a, or multiplexer 502a. Similarly, routing units 506, 507, 508, based on the destination memory location, may transmit data from their respective data manipulation operation blocks to multiplexer 501a or multiplexer 502a, if the control information indicated that no other data manipulation operation is requested or required.

Data transmitted for multiplexer 501a is destined for DMS memory. The data is initially aligned and accumulated in data alignment/accumulator 503, which writes the data to the destination memory location within DMS memory. Arbiter 501b is an arbiter for multiplexer 501a.

Data transmitted for multiplexer 502a is destined for DMEM. The data is aligned and accumulated in data alignment/accumulator 504, which writes the data to the destination memory location within DMEM memory. Arbiter 502b is an arbiter for multiplexer 502a.

Therefore, the output of each of the data manipulation operation blocks described above may be cascaded into an input of one of the other data manipulation operation blocks. For example, the output from the gather operation block can be fed in as the input into the scatter operation block. Similarly the output from ARLE compression/decompression block can be fed into the input of a gather, scatter, or a stride operation block. Furthermore, a data movement engine may skip some or all of the data manipulation operation blocks based on the control information provided by the descriptors.

Finally, the data manipulation operation blocks may each be concurrently executing (i.e. in the same clock cycles) on data manipulation operations on tabular data for different descriptors. For example, routing unit 514 routes tabular data received from multiplexer 516a for a first descriptor to ARLE decompression block 512. ARLE decompression block 512 decompresses the tabular data and transmits the decompressed tabular data and the associated control information for the descriptor to routing unit 508. Routing unit 508 transmits the tabular data resulting from the ARLE decompression and the control information for the first descriptor to multiplexer 515c.

Multiplexer 515c transmits the tabular data to gather operation block 511. Meanwhile, routing unit 514 routes tabular data received from multiplexer 516a for a second descriptor to ARLE decompression block 512. ARLE decompression block 512 decompresses the tabular data for the second descriptor while (i.e. within the same clock cycles) gather operation block 511 performs a gather operation on the tabular data for the first descriptor.

Row Count Generation During Gather Operation

Data Movement System 101 automatically calculates the total number of rows that are actually moved or copied from a source memory location to a destination memory location during a gather operation performed in BV mode. Data Movement System 101 eliminates the additional step of parsing a BV separately form the data movement operation to calculate the number of bits within the BV that are set. By calculating the total number of rows that were actually moved or copied from a source memory location to a destination memory location concurrently with the data movement operation, the number of instructions required to be executed by a core processor is also significantly reduced.

Specifically, during a BV mode gather operation, Data Movement System 101 generates a count of the rows moved as a result of having respective bit positions set in a BV. Such a count is referred to herein as a BV row count. Using a program descriptor that configures the scat/gat register and a data descriptor that specifies a BV mode gather operation, DMS 101 performs the gather operation and writes the BV row count at a DMEM address specified in the scat/gat register. The address is referred to herein as the BV count address.

FIG. 6 depicts descriptors used to configure Data Movement System 101 to perform a BV mode gather operation and generate a BV row count, and operations performed when executing the descriptors. Not all operations performed for these descriptors are depicted. Rather, operations pertinent to both performing a BV gather operation and generating a BV row count are highlighted.

Referring to FIG. 6, it depicts descriptor loop 601, which includes program descriptor 602, data descriptor 604, and loop descriptor 606. A descriptor loop is a set of linked descriptors for which Data Movement System 101 is configured, using a loop descriptor, to execute iteratively as a set. For purposes of illustration, core processor 104g generates descriptors 601, and forwards the descriptors to a descriptor channel block of DMAD 115g in the order depicted. Descriptors 601 are processed as previously described for data descriptors.

Program descriptor 602 is used to configure a scat/gat register to, as mentioned before, specify various aspects of performing a gather operation. Data descriptor 604 specifies to perform a gather operation on a column while moving the column from main memory to DMEM of a core processor. Loop descriptor 606 causes data descriptor 604 to be executed multiple iterations in a loop, similarly as described before herein for a loop descriptor.

Program descriptor 602 also configures the scat/gat register to specify a BV count address in DMEM for storing a BV row count, and to specify a BV count mode, which governs whether the BV row count is accumulated over multiple iterations of the loop.

For purposes of exposition, FIG. 6 does not depict a data descriptor used to move a BV from main memory to DMS memory 150. The data descriptor immediately precedes data descriptor 604.

After each execution of the gather operation for a descriptor, the row count generated for the gather operation is used to update the BV row count stored at the BV count address. In an embodiment, the BV row count is updated in one of two BV count modes: accumulate mode or overwrite mode. In overwrite mode, the BV row count generated for a descriptor in an iteration of a loop overwrites the value stored at the BV count address. In accumulate mode, the BV row count accumulates over iterations of the loop leaving an accumulated BV row count at the BV count address after execution of iterations of a loop. The configuration of the scat/gat register specifies the BV count mode.

In addition, Data Movement System 101 uses a BV row count to determine a new destination address for data descriptor 604 for subsequent iterations of the loop. The destination address in data descriptor 604 is changed so that rows moved in the subsequent iteration for data descriptor 604 are moved to a DMEM address that follows the last row moved for the current iteration for data descriptor 604, thereby avoiding overwriting rows for data descriptor 604.

At 610, according to program descriptor 602, the scat/gat register is configured to specify the BV count address and to specify that the BV count mode is accumulate. Similar to as described before, the scat/gat register is also configured to specify a BV address in DMS memory 150 for storing a BV and to specify that the filter mode is BV.

Operations 615-635 are operations for processing data movement descriptor 604. In general, data descriptor 604 is similarly processed by Data Movement System 101 as described before for data descriptors.

At 615, while executing the gather operation for data descriptor 604 in an iteration of the loop and after retrieving the respective BV from DMS memory 150, data movement engine 130d parses the BV to determine the number of bits set, the number being the BV row count. Data movement engine 130d scans through multiple bits per clock cycle within a BV, thereby parsing a BV at a significantly higher rate than a core processor executing software.

A determination is made of whether the current iteration of the loop is the first iteration. If so, then at 625, the BV row count is stored at the BV count address by overwriting the contents of the BV count address. Otherwise, at 630, the BV row count stored at the BV count address is updated by incrementing the contents of the BV count address by the just generated BV row count.

As explained before, eventually the descriptor is returned to the originating descriptor channel block of DMAD 115g, i.e. the descriptor channel block to which descriptors 601 originated from. In addition, the BV row count is also returned to the descriptor channel block. The descriptor channel block, using the DMEM location stored earlier in the aforementioned lookup table, updates the destination address of data descriptor 604 using the row count. Thus, in a subsequent iteration of the loop, rows moved to the DMEM unit 105g are moved to the location after the rows moved in the current iteration for data descriptor 604. The updated destination address is calculated according to the following formula:

New Destination Address=current destination address+(BV row count*column width)

At 640, pursuant loop descriptor 606, Data Movement System 101 processes descriptor 604 again in another iteration of the loop, if the end of the loop is not reached.

The capability to automatically calculate the number of rows moved by Data Movement System 101 during a BV mode gather operation for a data descriptor and update the destination address of the data descriptor enables the data descriptor to be used in a descriptor loop such that the entire set of filtered rows generated by the loop are stored contiguously in the destination DMEM. Without this capability, a core processor must make a software based determination of the row count to determine a destination address in a data descriptor needed to store a next set of filtered rows contiguously with a previous set of filtered rows.

Figure 7B:
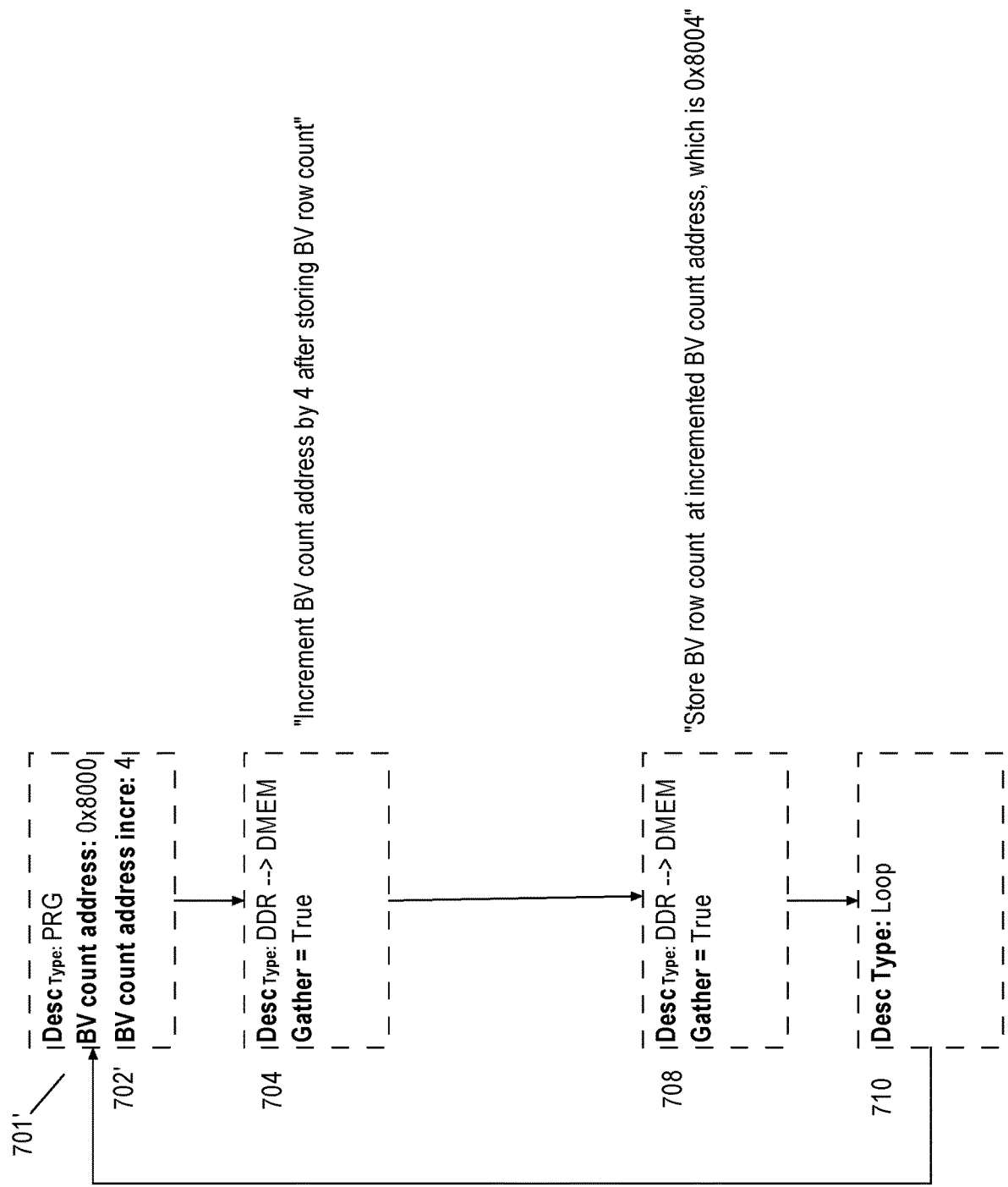
FIG. 7B illustrates a descriptor loop for performing a hardware accelerated gather operation that includes generating multiple row counts that is different than that shown in FIG. 7A.

Multiple data descriptors within a loop may each specify a gather operation using a different BV. A different BV row count is generated for each data descriptor. FIG. 7A and FIG. 7B depict such chains of descriptors, which are configured to separately store a BV row count for each such data descriptor.

Row Counts for Multiple BVS

Referring to FIG. 7A, it depicts descriptor chain 701. Descriptor chain 701 comprises in order, program descriptor 702, data descriptor 704, program descriptor 706, data descriptor 708, and loop descriptor 710.

For purposes of exposition, not shown in FIG. 7 are data descriptors used to move a BV from main memory to DMS memory 150. A data descriptor for moving a BV immediately precedes each of data descriptor 704 and data descriptor 708.

Similar to as described before, program descriptor 702 and program descriptor 706 specify various aspects of performing a gather operation. However, each of program descriptor 702 and program descriptor 706 specify a different BV count address, which are 0x8000 and 0x8004, respectively.

When Data Movement System 101 processes descriptor chain 701, a BV row count is generated for each of data descriptor 704 and data descriptor 708. For the BV row count generated for data descriptor 704, Data Movement System 101 updates the contents at BV count address 0x8000 based on the BV row count generated and the BV count mode, as specified by the scat/gat register, which had been configured according to program descriptor 702. For the BV row count generated for data descriptor 708, Data Movement System 101 updates the contents at BV count address 0x8004 based on the BV row count generated and BV count mode, as specified by the scat/gat register, which had been configured according to program descriptor 706.

In an embodiment, the scat/register can be configured to cause DMS 101 to increment the BV count address after storing a BV row count for a data descriptor. Thus, when storing a BV row count for a subsequent data descriptor, the BV row count is stored separately at a different BV count address.

FIG. 7B shows descriptor chain 701', configured to increment the BV count address as described above. Referring to FIG. 7B, it depicts descriptor chain 701'. Descriptor chain 701' comprises in order, program descriptor 702', data descriptor 704, data descriptor 708, and loop descriptor 710. Program descriptor 702' includes a field BV count address increment value, which specifies a value (i.e. 4) by which to increment the BV count address within the scat/gat register after storing a BV row count for a data descriptor.

Specifically, in an iteration of the loop for descriptor chain 701', DMS 101 configures the scat/reg register as specified in program descriptor 702'. This configuration includes setting the BV count address to 0x8000. After storing a row count for data descriptor 704 in DMEM unit 105g at address 0x8000, Data Movement System 101 increments the BV count address in scat/reg by 4 to 0x8004. When storing the BV row count generated for data descriptor 708, Data Movement System 101 stores the BV row count in DMEM unit 105g at the incremented address 0x8004.

In the next iteration of the loop, Data Movement System 101 resets BV count address to 0x8000 when processing program descriptor 702'. Thus, when storing the BV row count for data descriptor 704, the BV row count stored for data descriptor 704 in the previous iteration is updated.

A data descriptor may specify other data manipulation operations other than a gather, such as a scatter or stride operation. The Data Movement System 101 supports "operation aware updating" of the destination address specified by a data descriptor for a BV mode gather operation. Data Movement System 101 accounts for other operations (such as stride and scatter) enabled in the descriptor along with the BV gather operation to determine a new destination address. For example, when performing column major to row major conversion along with a BV based gather operation while executing a data descriptor numerous times as part of a descriptor loop, the BV row counts are calculated during previous iterations of the descriptor and are multiplied by the "stride" which is the number of bytes in a row in case of conversion to row major—to determine the new destination address to be used during the current iteration of the loop.

Using BV Row Counts for Partitioning

As mentioned previously, Data Movement System 101 can perform partitioning of columns between core processors. The several stages of partitioning are performed, at least in part, by several engines within Data Movement System 101. Accordingly, BV row counts generated by DMS 101 are used to perform the respective stages of partitioning more efficiently. Partitioning is described in greater detail in the Partitioning Application.

Partitioning of rows is performed in three stages. In the first partitioning stage 421 (see Partitioning Application), which is referred to herein as the "DMS load stage", a subset of rows of a set of columns to partition is loaded into DMS memory 150 from main memory.

In the second partitioning stage 422 (see Partitioning Application), referred to herein as the "CID generation stage", a column of core processor identifiers (CID's) are generated within DMS memory 150, each CID belonging to a row in the subset of rows being partitioned. The CID's are generated by a block of circuitry referred to herein as a HARE engine.

In the third stage, columns of each row are distributed to the core processor identified by the row's CID. The distribution is performed by a block of circuitry referred to herein as a partition engine.

Each stage is performed according to a set of descriptors. For the first stage, the DMS memory load stage, is performed using data descriptors to move a set of columns to the DMS memory 150.

According to an embodiment, the DMS load stage is performed using gather operations in BV mode to move columns to DMS memory 150. The BV row count generated is used to inform the later stages of partitioning of how many rows to process. The Data Movement System 101 performing a gather operation in BV mode to load columns to DMS memory triggers the Data Movement System 101 to transmit the BV row count generated for the respective BV to the HARE engine and Partition engine. The HARE engine uses the row count to determine how many CIDs to generate. The Partition engine uses the row count to determine how many rows need to be partitioned from columns in DMS memory 150, which include the columns that were moved to DMS memory 150 during the DMS load stage.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   in response to a respective memory location of a first descriptor of a set of descriptors being pushed into a first regiuster within a register space space that is accessible by a first set of electonic circuits, said first set of electronic circuits perfomring:
   accessing said first description at the respective memory location of said first descriptor, wherein each descriptor of said set of descriptors is stored in a respective memory location or said each descriptor, wherein said first descriptor specifies:
      a width of a column of tabular data;
      a number of rows of said tabular data;
      one or more data manipulation operations to perform on the column of tabular data, said one or more data manipulation operations including a gather operation;
      a destination memory location, in a destination memory, for a data manipulation result of said one or more data manipulation operations;
   based on a bit vector, generating resultant tabular data of said gather operation;
   storing said resultant tabular data at the said destination memory location;
   generating a row count specifying a number of rows in said resultant tabular data; and
   updating a particular memory location based on said row count.

2. The method of claim 1, wherein said first set of electronic circuits performing includes modifying, based on said row count, said first descriptor to specify a different destination memory location.

3. The method of claim 2, wherein said first set of electronic circuits performing includes:
   based on another bit vector, generating other resultant tabular data of said gather operation; and
   storing said other resultant tabular data at said different destination memory location.

4. The method of claim 1, wherein updating a particular memory location includes overwriting said particular memory location.

5. The method of claim 1, wherein updating said particular memory location includes adding said row count to contents of said particular memory location.

6. The method of claim 1, wherein said first set of electronic circuits includes a particular register that specifies said particular memory location, thereby causing said first set of electronic circuits to update said particular memory location.

7. The method of claim 6, wherein said first set of descriptors includes a program descriptor that specifies said particular memory location, wherein said first set of electronic circuits performing includes configuring, according to said program descriptor, said first register to specify said particular memory location.

8. The method of claim 2, wherein said first descriptor specifies a second data manipulation operation, wherein modifying, based on said row count, said first descriptor to specify a different destination memory location includes modifying based on said row count and said second data manipulation operation.

9. The method claim 8, wherein said second data manipulation operation is either a stride operation or a scatter operation.

10. The method of claim 1, wherein said first set of descriptors includes a second set of descriptors, wherein said first set of electronic circuits performing includes said first set of electronic circuits partitioning, according to said second set of descriptors and said row count generated, said number of rows of said resultant tabular data among a set of core processors.

11. The method of claim 1, wherein:
said first descriptor specifies a source memory location for said tabular data;
said first set of descriptors includes a second descriptor that specifies:
  another source memory location for other tabular data;
  said gather operation, and
  another destination memory location, in said destination memory, for a data manipulation result of said one or more data manipulation operations;
wherein said first set of descriptors includes a program descriptor that specifies said particular memory location and that specifies to increment said particular memory location;
wherein said first set of electronic circuits performing includes:
  configuring, according to said program descriptor, said first register to specify said particular memory location to increment said particular memory location;
  after storing said row count at said particular memory location, changing said particular memory location in response to said program descriptor specifying to increment said particular memory location;
  based on another bit vector, generating other resultant tabular data of said gather operation;
  storing said other resultant tabular data at the said another destination memory location;
  generating another row count specifying a number of rows in said other resultant tabular data; and
  updating said changed particular memory location based on said row count.

12. A single chip comprising a first register space and first electronic circuitry, said first electronic circuitry being configured to:
in response to a respective memory location of a first descriptor of a set of descriptors being pushed into a first register within a register space that is accessible by a first set of electronic circuits,
access said first descriptor at the respective memory location of said first descriptor, wherein each descriptor of said set of descriptors is stored in a respective memory location for said each descriptor, wherein said first descriptor specifies:
  a width of a column of tabular data;
  a number of rows of said tabular data;
  one or more data manipulation operations to perform on the column of tabular data, said one or more data manipulation operations including a gather operation;
  a destination memory location, in a destination memory, for a data manipulation result of said one or more data manipulation operations;
  based on a bit vector, to-generate resultant tabular data of said gather operation;
  store said resultant tabular data at said destination memory location;
  generate a row count specifying a number of rows in said resultant tabular data; and
  update a particular memory location based on said row count.

13. The single chip of claim 12, wherein said first set of electronic circuits is configured to modify, based on said row count, said first descriptor to specify a different destination memory location.

14. The single chip of claim 13, wherein said first set of electronic circuits is configured to:
based on another bit vector, generate other resultant tabular data of said gather operation; and
store said other resultant tabular data at said different destination memory location.

15. The single chip of claim 12, wherein to update a particular memory location includes to overwrite said particular memory location.

16. The single chip of claim 12, wherein to update said particular memory location includes to add said row count to contents of said particular memory location.

17. The single chip of claim 12, wherein said first set of electronic circuits includes a particular register that specifies said particular memory location, wherein said first set of electronic circuits is configured to update a memory location specified by said particular register.

18. The single chip of claim 17, wherein said first set of descriptors includes a program descriptor that specifies said particular memory location, wherein said first set of electronic circuits is configured to configure, according to said program descriptor, said first register to specify said particular memory location.

19. The single chip of claim 13, wherein said first descriptor specifies a second data manipulation operation, wherein to modify, based on said row count, said first descriptor to specify a different destination memory location includes to modify based on said row count and said second data manipulation operation.

20. The single chip claim 19, wherein said second data manipulation operation is either a stride operation or a scatter operation.

21. The single chip of claim 12, wherein said first set of descriptors includes a second set of descriptors, wherein said first set of electronic circuits is configured to partition, according to said second set of descriptors and said row count generated, said number of rows of said resultant tabular data among a set of core processors.

22. The single chip of claim 12, wherein:
said first descriptor specifies a source memory location for said tabular data;
said first set of descriptors includes a second descriptor that specifies:

another source memory location for other tabular data; said gather operation, and another destination memory location, in said destination memory, for a data manipulation result of said one or more data manipulation operations;

wherein said first set of descriptors includes a program descriptor that specifies said particular memory location and that specifies to increment said particular memory location;

wherein said first set of electronic circuits is configured to:

configure, according to said program descriptor, said first register to specify said particular memory location to increment said particular memory location;

after storing said row count at said particular memory location, change said particular memory location in response to said program descriptor specifying to increment said particular memory location;

based on another bit vector, generate other resultant tabular data of said gather operation;

store said other resultant tabular data at said another destination memory location;

generate another row count specifying a number of rows in said other resultant tabular data; and update said changed particular memory location based on said row count.

* * * * *

UNITED STATES PATENT AND TRADEMARK OFFICE
CERTIFICATE OF CORRECTION

PATENT NO. : 10,725,947 B2
APPLICATION NO. : 15/364149
DATED : July 28, 2020
INVENTOR(S) : Jain et al.

Page 1 of 1

It is certified that error appears in the above-identified patent and that said Letters Patent is hereby corrected as shown below:

In the Specification

In Column 2, Line 7, delete "blocks" and insert -- blocks. --, therefor.

In Column 14, Line 36, delete "the"Src" and insert -- the "Src --, therefor.

In the Claims

In Column 40, Line 27, in Claim 1, delete "regiuster" and insert -- register --, therefor.

In Column 40, Line 27, in Claim 1, delete "space space" and insert -- space --, therefor.

In Column 40, Line 28, in Claim 1, delete "electonic" and insert -- electronic --, therefor.

In Column 40, Line 29, in Claim 1, delete "perfomring:" and insert -- performing: --, therefor.

In Column 40, Line 30, in Claim 1, delete "description" and insert -- descriptor --, therefor.

In Column 40, Line 33, in Claim 1, delete "or" and insert -- for --, therefor.

In Column 41, Line 18, in Claim 9, delete "method" and insert -- method of --, therefor.

In Column 42, Line 13, in Claim 12, delete "to-generate" and insert -- generate --, therefor.

In Column 42, Line 54, in Claim 20, after "chip" insert -- of --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*